(12) United States Patent
Okuda et al.

(10) Patent No.: US 8,040,431 B2
(45) Date of Patent: Oct. 18, 2011

(54) TERMINAL COVER FOR CAMERA APPARATUS

(75) Inventors: Keita Okuda, Kanagawa (JP); Hidenori Ishibashi, Tokyo (JP); Hidetoshi Isawa, Kanagawa (JP); Tatsuya Yamazaki, Tokyo (JP)

(73) Assignee: Sony Corporation (JP)

( * ) Notice: Subject to any disclaimer, the term of this patent is extended or adjusted under 35 U.S.C. 154(b) by 483 days.

(21) Appl. No.: 12/317,087

(22) Filed: Dec. 18, 2008

(65) Prior Publication Data

US 2009/0161007 A1 Jun. 25, 2009

(30) Foreign Application Priority Data

Dec. 25, 2007 (JP) ................. P2007-333029

(51) Int. Cl.
*H04N 5/225* (2006.01)

(52) U.S. Cl. ........ 348/373; 348/374; 348/375; 348/376
(58) Field of Classification Search .................. D16/202
See application file for complete search history.

(56) References Cited

U.S. PATENT DOCUMENTS

| 7,519,292 | B2 * | 4/2009 | Takahashi et al. ............ 396/535 |
| 7,561,203 | B2 * | 7/2009 | Pistemaa et al. ............. 348/375 |
| 2005/0157196 | A1 * | 7/2005 | Cha et al. ................. 348/333.06 |
| 2005/0191885 | A1 * | 9/2005 | Son ................. 439/135 |
| 2005/0237426 | A1 | 10/2005 | Takashima et al. |
| 2006/0203124 | A1 * | 9/2006 | Park et al. ..................... 348/376 |
| 2007/0165996 | A1 | 7/2007 | Inaba et al. |

FOREIGN PATENT DOCUMENTS

| JP | 09-163199 A | 6/1997 |
| JP | 2002-064280 A | 2/2002 |
| JP | 2005-315989 A | 11/2005 |
| JP | 2007-174584 A | 7/2007 |

* cited by examiner

*Primary Examiner* — Lin Ye
*Assistant Examiner* — John H Morehead, III
(74) *Attorney, Agent, or Firm* — Lerner, David, Littenberg, Krumholz & Mentlik, LLP

(57) ABSTRACT

Disclosed is a camera apparatus including an enclosure configured to enclose an imaging unit, a terminal arrangement unit arranged adjacent to a curved surface of an edge portion of the enclosure, and a cover member for covering the terminal arrangement unit, configured to move to open in parallel and along a straight guide groove provided near the terminal arrangement unit, and to turn along the curved surface of the edge portion when the cover has moved to open a prescribed amount along the straight guide groove.

4 Claims, 24 Drawing Sheets

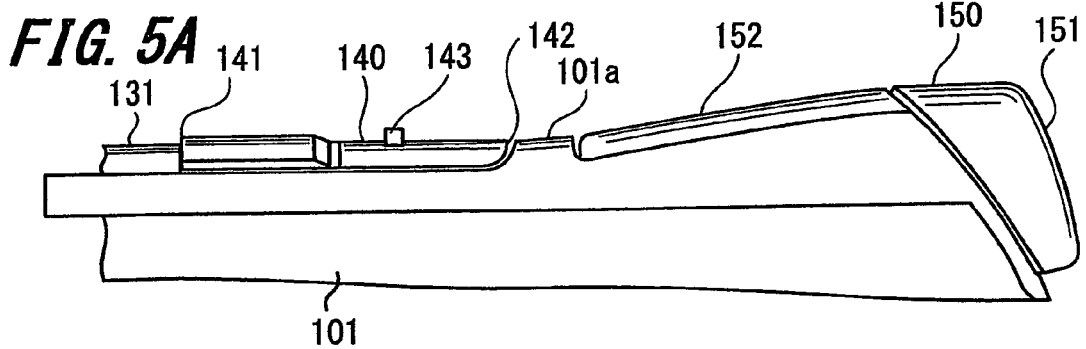
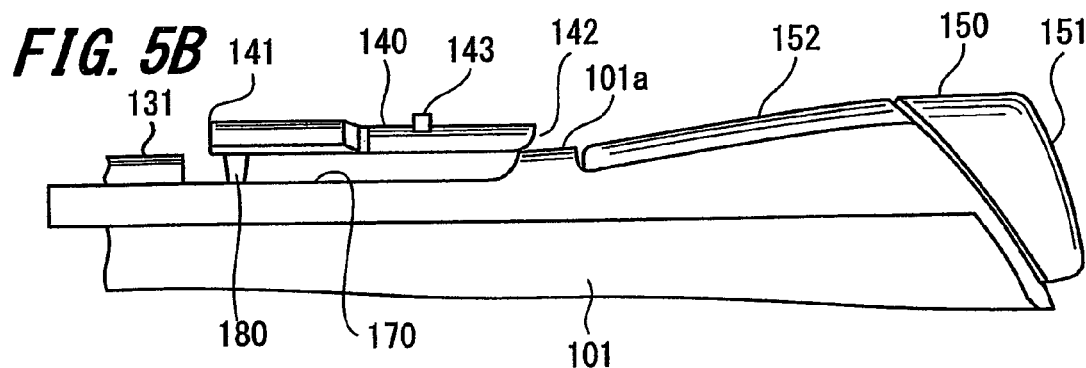
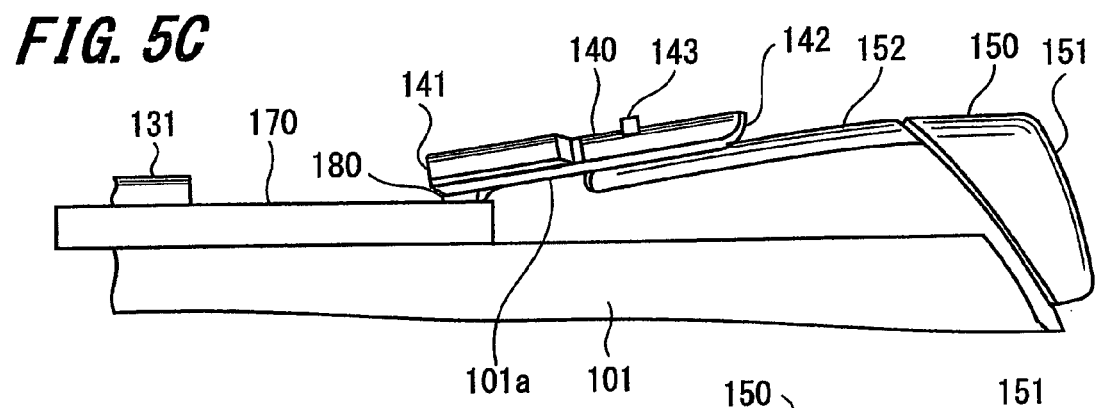
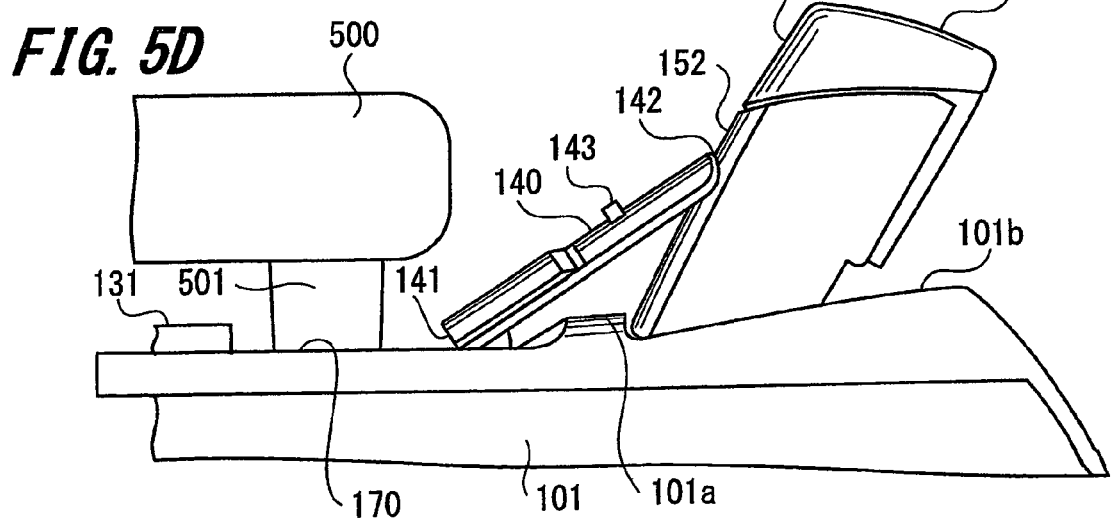

FIG. 12
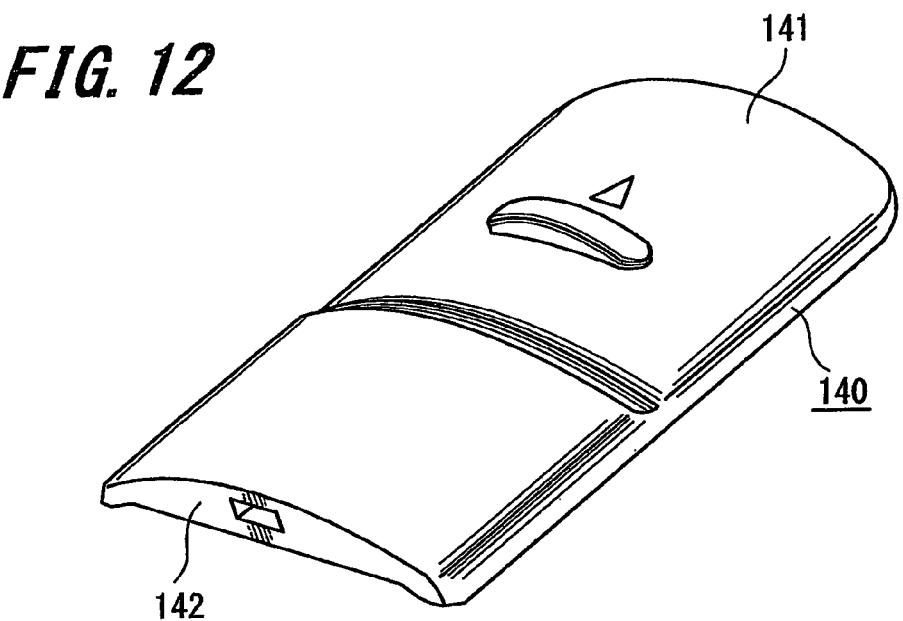
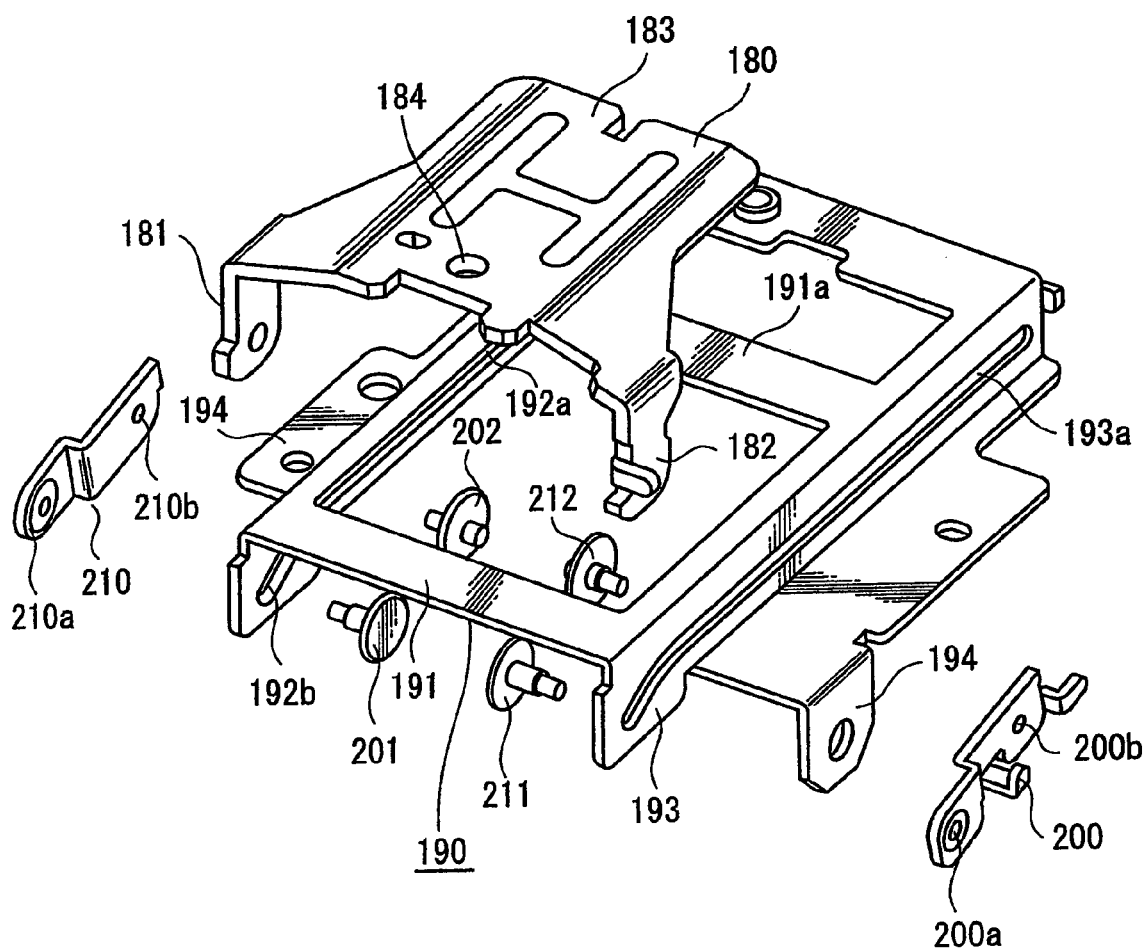

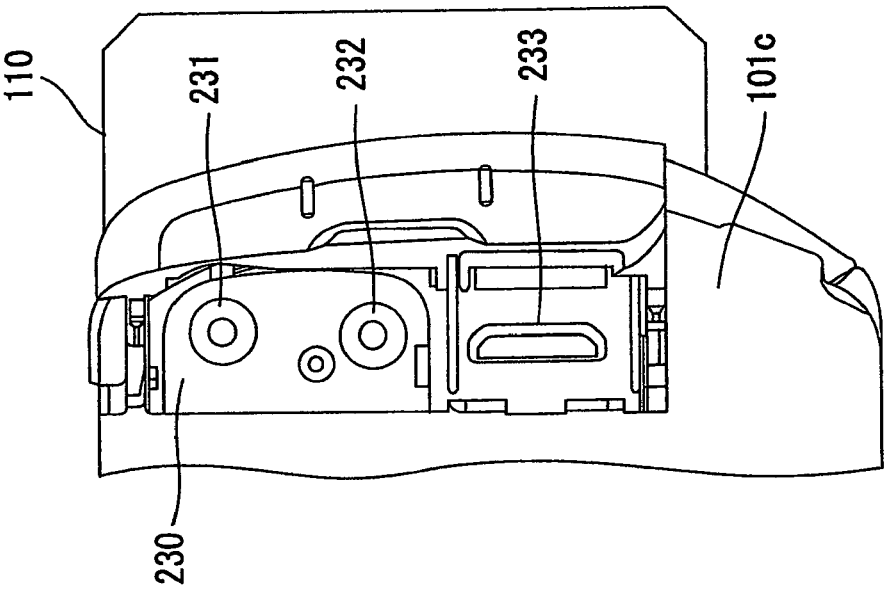
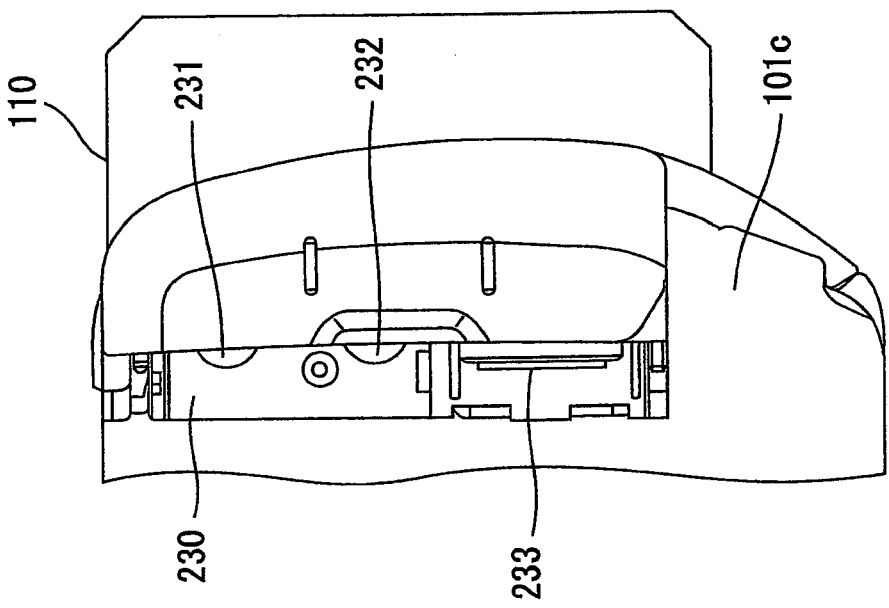
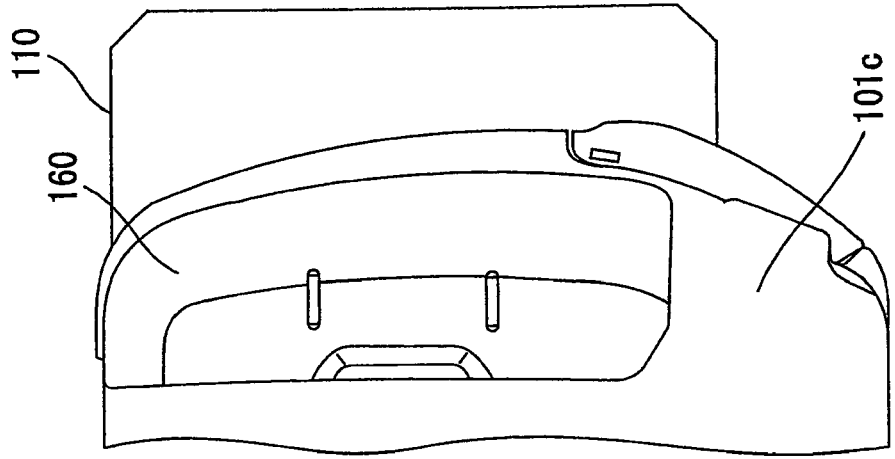

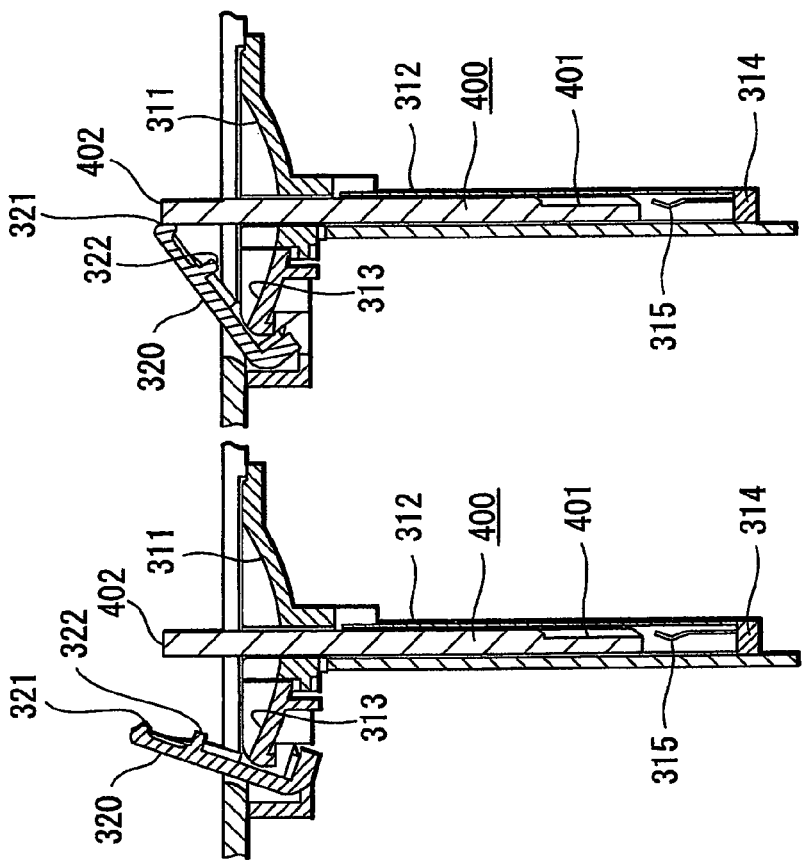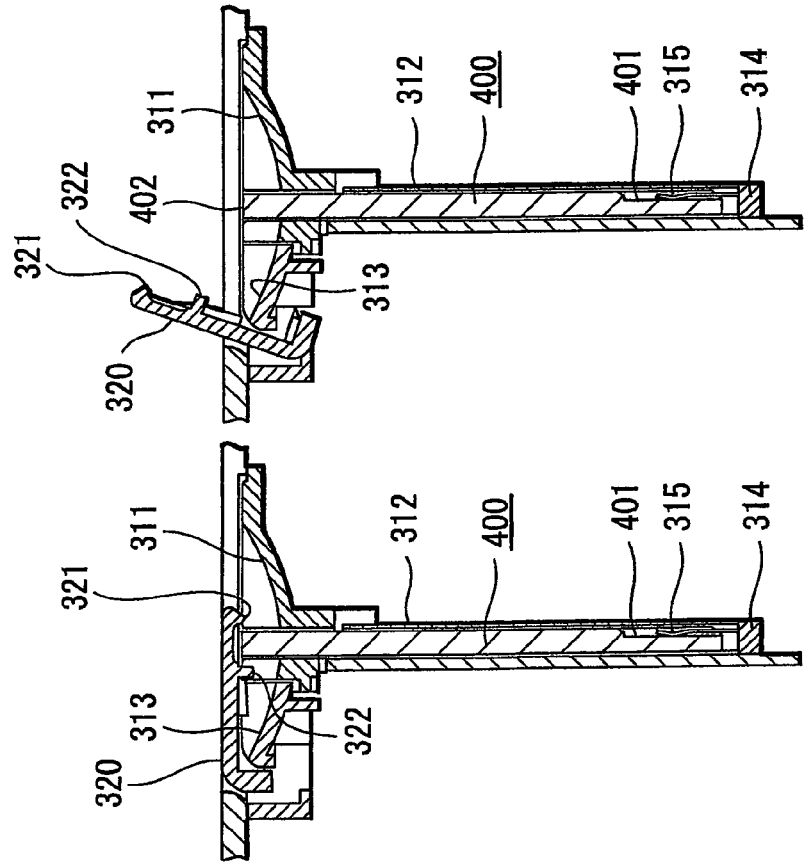

TERMINAL COVER FOR CAMERA APPARATUS

CROSS REFERENCES TO RELATED APPLICATIONS

The present application claims priority from Japanese Patent Application No. JP 2007-333029, filed in the Japanese Patent Office on Dec. 25, 2007, the entire content of which is incorporated herein by reference.

BACKGROUND OF THE INVENTION

1. Field of the Invention

The invention relates to a camera apparatus that is suitably utilized as a digital camcorder and digital still camera, and the like.

2. Description of the Related Art

Camera apparatuses such as digital camcorders usually incorporate lenses used for imaging and an imaging unit for forming images through the lenses. The lenses and the imaging unit are usually enclosed in an enclosure of a camera main body, to which various accessories can be attached.

For example, a connecting mechanism called an "accessory shoe" is mounted on an upper surface of the camera apparatus, and accessories such as an external microphone and a video light can be attached to the accessory shoe. Since the accessory shoe can be an obstacle when it is not used, or can get dirty or dusty when the accessory shoe is exposed outside, the accessory shoe is protected with a cover, thereby preventing the accessory shoe from getting dirty or dusty.

In camcorders, the accessory shoe generally includes terminals for connecting to video cables or audio cables. The accessory shoe with such terminals can also be protected with a cover when the terminals are not in use.

In camcorders with a memory card slot, into which a memory card can be fitted, a cover is provided over the memory card so that the memory card is not exposed.

Japanese Unexamined Patent Application Publication No. 2005-315989 discloses a camera apparatus having an accessory shoe over which a cover is provided. FIG. 1 in the publication illustrates a detachable cover 114 to cover the accessory shoe of the camera apparatus.

Japanese Unexamined Patent Application Publication No. H09-163199 discloses a camera apparatus having a terminal unit over which a cover is provided. FIGS. 7 and 8 in the publication illustrate a terminal cover portion, which is formed of resin and can be elastically deformed. Specifically, one end of the cover formed of resin that is elastically deformed is fixed to a main body of the camera, and the other end of the cover is placed over the terminal.

Japanese Unexamined Patent Application Publication No. 2007-174584 discloses a camera apparatus having a memory card slot that is covered with a display panel.

SUMMARY OF THE INVENTION

There may be some implications for providing a cover over accessories such as an accessory shoe, terminal, or memory card slot.

For example, it is not preferable to provide a detachable cover over the accessory shoe as disclosed in Japanese Unexamined Patent Application Publication No. 2005-315989, because the cover may be lost while the cover is detached from the accessory shoe. It is possible to provide a cord or string to the cover to tie up with the camera main body, thereby preventing the cover to be lost in this manner; however, it may not be aesthetically acceptable to have the cord or string for the camera apparatus.

For example, a cover slides in parallel to a surface of a camera enclosure over the accessory shoe to open or close. When the cover is open, the accessory shoe is exposed to be connectable with accessories; whereas when the cover is closed, the accessory shoe is covered. In this configuration, not only will the cover of the accessory shoe be lost as the example given the detachable cover disclosed in Japanese Unexamined Patent Application Publication No. 2005-315989; but aesthetic appearance thereof can also be improved.

An accessory shoe is mainly provided for attaching a microphone or a light to the camera apparatus, so that the accessory shoe is provided to only limit place of the camera apparatus, such as an area closed to the upper part of a lens tube thereof. Therefore, it is important to secure enough space for the cover to slide. In particular, it is important for a consumer camera apparatus to reduce the size thereof and secure the space for the cover of the accessory shoe to slide at the same time.

As illustrated in the terminal cover of the camera apparatus disclosed in Japanese Unexamined Patent Application Publication No. H09-163199, since the camera apparatus is configured to include the resin cover that can be elastically deformed, one end of which is constantly attached to a camera main body, it is highly improbable to lose the cover. However, when the terminal cover is open, since the other end of the terminal cover that is taken off and extended from the camera main body is dangling in the air, appearance of such appearance is also not so much aesthetically present.

It is possible to improve the appearance of the terminal cover of the camera apparatus by replacing it with slidable cover; however, in view of reducing the size of the camera apparatus, the camera apparatus may still need securing enough space for the cover to slide when the cover is open.

Next, the camera apparatus having a memory card slot provided with a cover is described. When the memory card is fitting into the memory card slot, the memory card is locked in the card slot. In this state, an end of the memory card is brought into contact with a contact point of the memory card slot, such that the camera main body can read data from the memory card. Generally, when the memory card is pushed all the way to the back of the slot, the memory card is locked. In this condition, the memory card will not be taken out of the memory card slot. When the locked memory card is pushed all the way to the back of the memory card slot again, the memory card is ejected from the memory card slot by the action of a spring arranged at the back of the memory card slot, and the memory card can thus be taken out of the memory card slot.

However, if a cover is provided on the memory card slot while the memory card is not completely locked, and the cover will push the memory card all the way to the back of the memory card slot. This brings the end of the memory card into contact with the contact point of the memory card slot, and hence data can be read from or write on the memory card.

If the memory card slot is closed with the cover while the memory card is still unlocked, the memory card is suddenly ejected from the memory card slot simultaneously on opening the cover of the memory card slot. In this case, if the cover of the memory card slot is opened while data is still being written on the memory card, the writing processing is interrupted to cause writing error.

Thus, it is not preferable that the cover be closed while the memory card is still unlocked.

According to embodiments of the invention, there is provided a camera apparatus including an enclosure, components of which are covered with cover members that are practically easy-to-use and aesthetically well-designed.

Embodiments of the invention can be applied to a camera apparatus including an imaging unit and an enclosure enclosing the imaging unit. The enclosure of the camera apparatus includes a terminal arrangement unit that is arranged adjacent to a curved surface of an edge portion of the enclosure, and a cover member for covering the terminal arrangement unit that is configured to move to open in parallel and along a straight guiding groove near the terminal arrangement unit, and to turn along the curved surface of the edge portion when the cover member moves to open a prescribed amount.

With this configuration, the cover member for the terminal arrangement unit turns along the curved surface of the edge portion of the enclosure, and is opened at an excellent position.

According to the embodiments of the invention, the cover member will not be an obstacle to the lens tube when the cover member for the terminal arrangement unit opens, and the cover member is arranged with aesthetically well-designed arrangement.

BRIEF DESCRIPTION OF THE DRAWINGS

FIGS. 5A to 5D are side views each illustrating one example of the accessory shoe cover and the viewfinder of the camera apparatus according to an embodiment of the invention.

FIG. 12 is an exploded perspective view of the accessory shoe cover and its moving mechanism of FIG. 6.

FIGS. 17A to 17C are side views each illustrating the terminal cover in open and closed configurations according to an embodiment of the invention.

FIGS. 24A to 24D are cross sectional views illustrating one example of a memory card slot in various configurations according to an embodiment of the invention.

DESCRIPTION OF THE PREFERRED EMBODIMENTS

Embodiments of the invention will now be described below with reference to accompanying drawings.

FIGS. 1 to 4 are perspective views according to an embodiment of a camera apparatus viewed from the same direction but illustrating different configurations.

Figure 1:
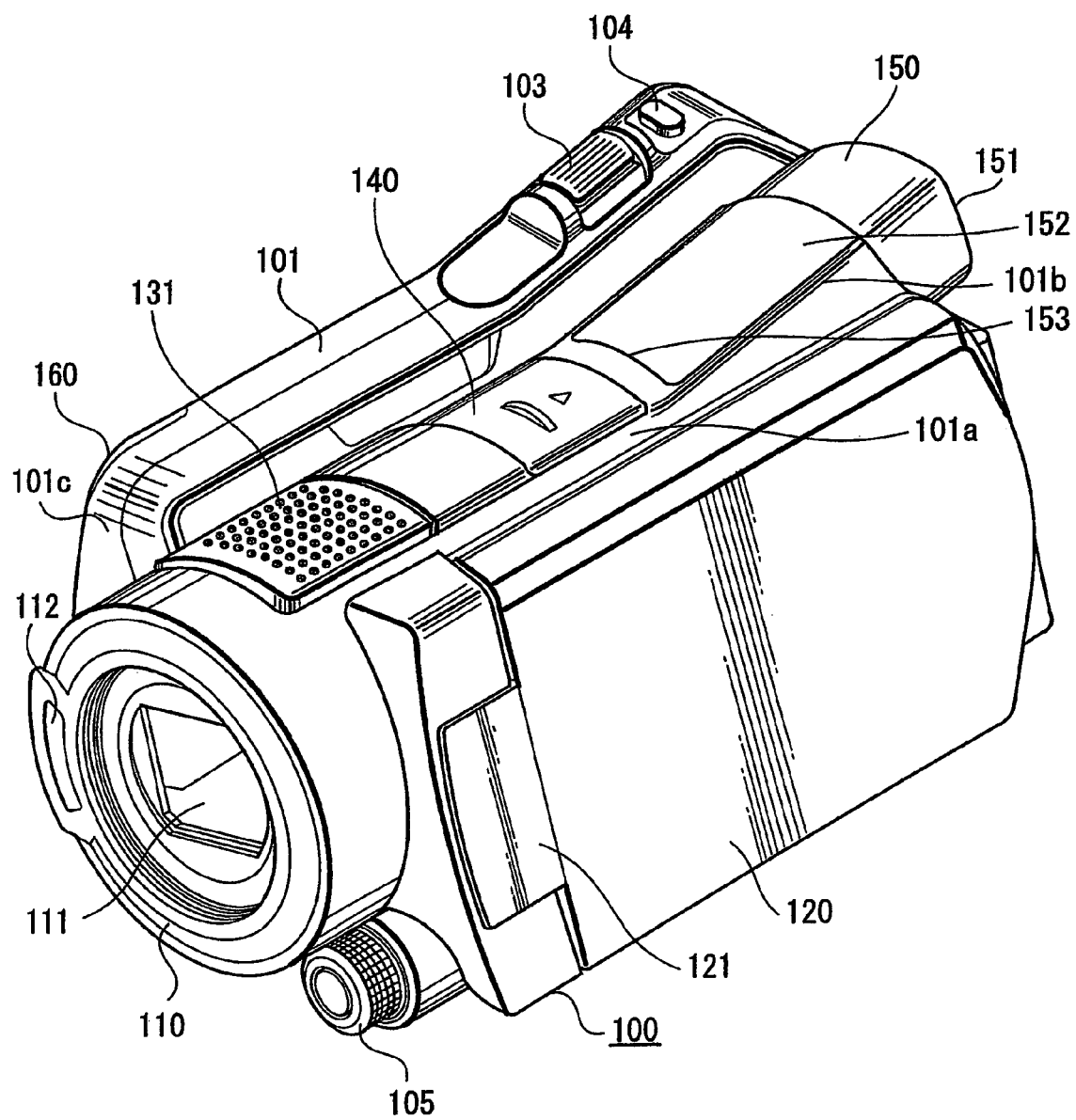
FIG. 1 is a perspective view illustrating one example of a camera apparatus according to an embodiment of the invention.

The embodiments described below are those applied to a digital camcorder. As shown in FIG. 1, a camera main body 101 includes a video camera apparatus 100 and a lens tube 110 at a foreside of the main body 101. The lens tube 110 includes a prescribed number of lenses (not shown) therein, a lens cover 111 located at the foreside of the lenses arranged. The lens cover 111 is open when capturing images of subjects. A light 112 is provided adjacent to the lens tube 110 to flash the imaging subjects. Hereinafter, "a front portion" is defined as a portion including the video camera apparatus 100 and lens tube 110 whereas "a rear portion" is defined as a portion in which a viewfinder 150 is arranged in the camera main body 101. In addition, the left or right of the main body 101 implies the left or right of the main body 101 viewed from the rear side thereof.

Image light, which is obtained through lenses arranged in the lens tube 110 of the video camera apparatus 100, is incident on an imaging device such as a CCD imager, and is converted into an electric image signal. The electric image signal is processed by an image signal processor, and the resulting image signal is stored (recorded) on recording media. The video camera apparatus 100 of the embodiment includes a hard disk and a memory card as recording media. A hard disk drive (not shown) incorporated in the main body 101 contains the hard disk. The memory card employed in this embodiment can be inserted into and removed from a memory card slot 312 (see FIG. 22) that will be described later. The image signal can be recorded on other recording media such as an optical disk, magnetic tape, and internal memory. Alternatively, the image signal can be transmitted via a communication device. The video camera apparatus 100 includes two recording modes for recording the image signal on the recording media, namely, a video mode for recording a dynamic image signal (video signal) and a still mode for recording a static image (still image signal). The image signal is supplied to a display panel unit 120 to display images on a panel 122 (see FIG. 22) fixed to the display panel unit 120. The image signal is also supplied to the viewfinder 150 to display images. FIG. 1 shows the display panel unit 120 in a closed configuration and the panel 122 to display images is housed inside thereof.

The viewfinder 150 is arranged on an upper surface 101a at the rear side of the main body 101, and an eyepiece 151 is arranged at the rear side of the viewfinder 150. An upper surface 152 of the viewfinder 150 is raised from the upper surface 101a towards slightly rear side of the main body 101a.

Figure 2:
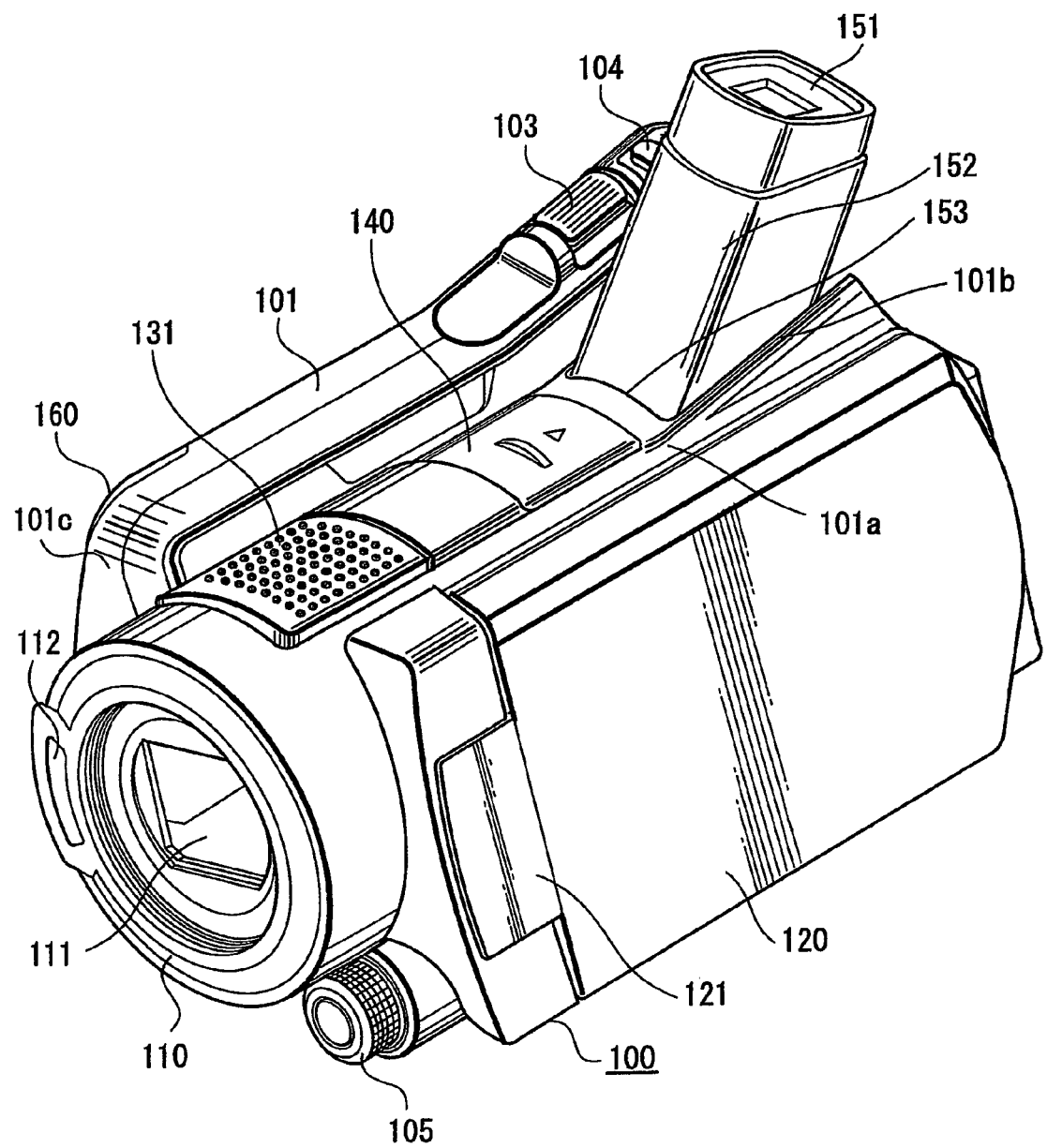
FIG. 2 is a perspective view illustrating a viewfinder of the camera apparatus in a raised configuration according to an embodiment of the invention.

A turning fulcrum 153 is located at a foreside of the viewfinder 150, and the eyepiece 151 is raised based on the turning fulcrum 153. FIG. 2 is the eyepiece 151 of the viewfinder 150 in a raised configuration. As shown in FIG. 2, capturing images of subjects from lower angles can be facilitated by raising the eyepiece 151 of the viewfinder 150. The viewfinder 150 that can be raised is housed in a gap 101b, and an upper surface 152 of the viewfinder 150 and the upper surface 101a of the main body 101 are integrally arranged when the viewfinder 150 is housed in the gap 101b.

A microphone 131 and an accessory shoe cover 140 are arranged on the upper surface 101a of the main body 101 in this order from the front, and the viewfinder 150 is arranged behind the accessory shoe cover 140. The microphone 131 is used for collecting surrounding sound in capturing images of subjects.

Figure 3:
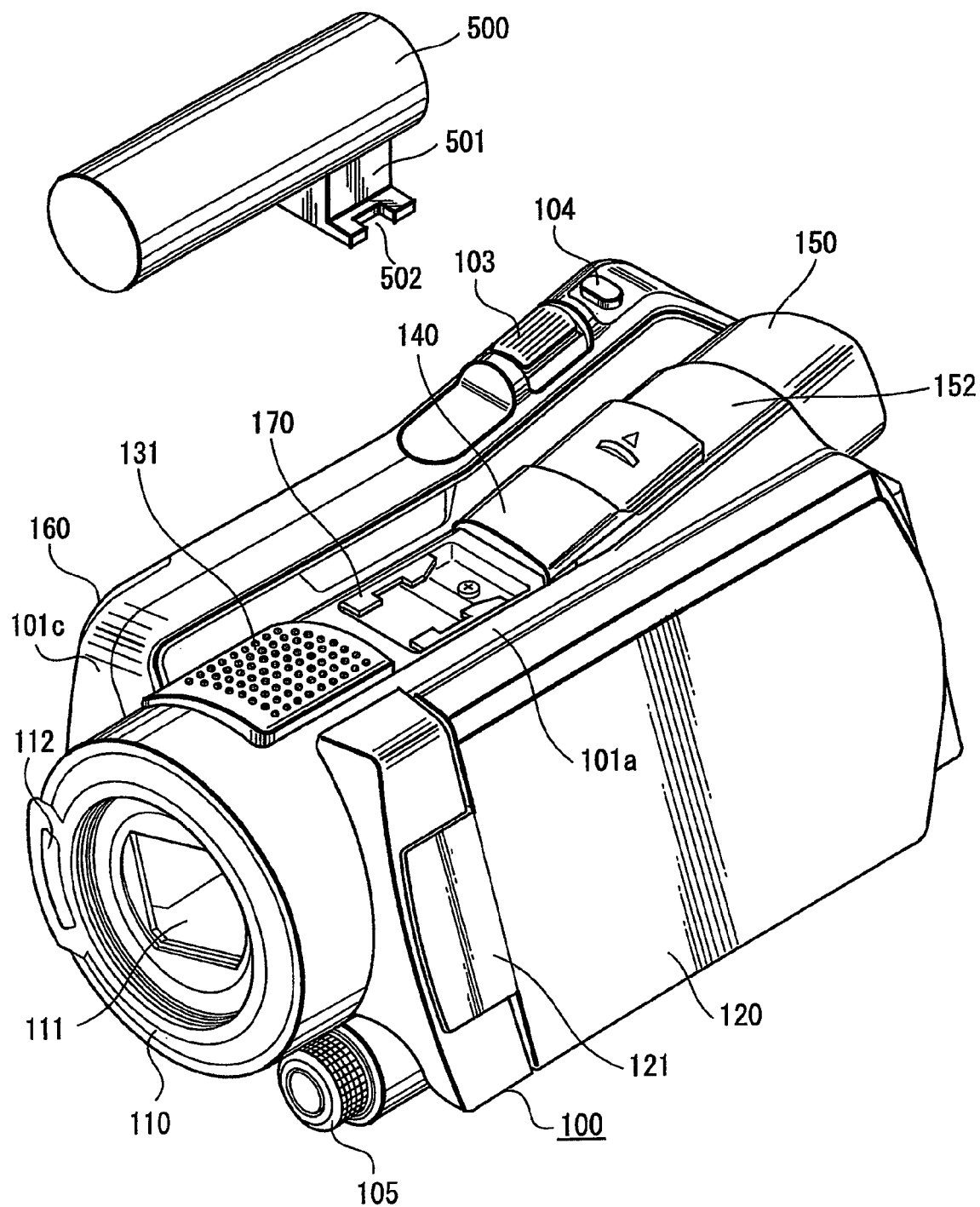
FIG. 3 is a perspective view illustrating an accessory shoe cover of the camera apparatus in an opened configuration according to an embodiment of the invention.
Figure 4:
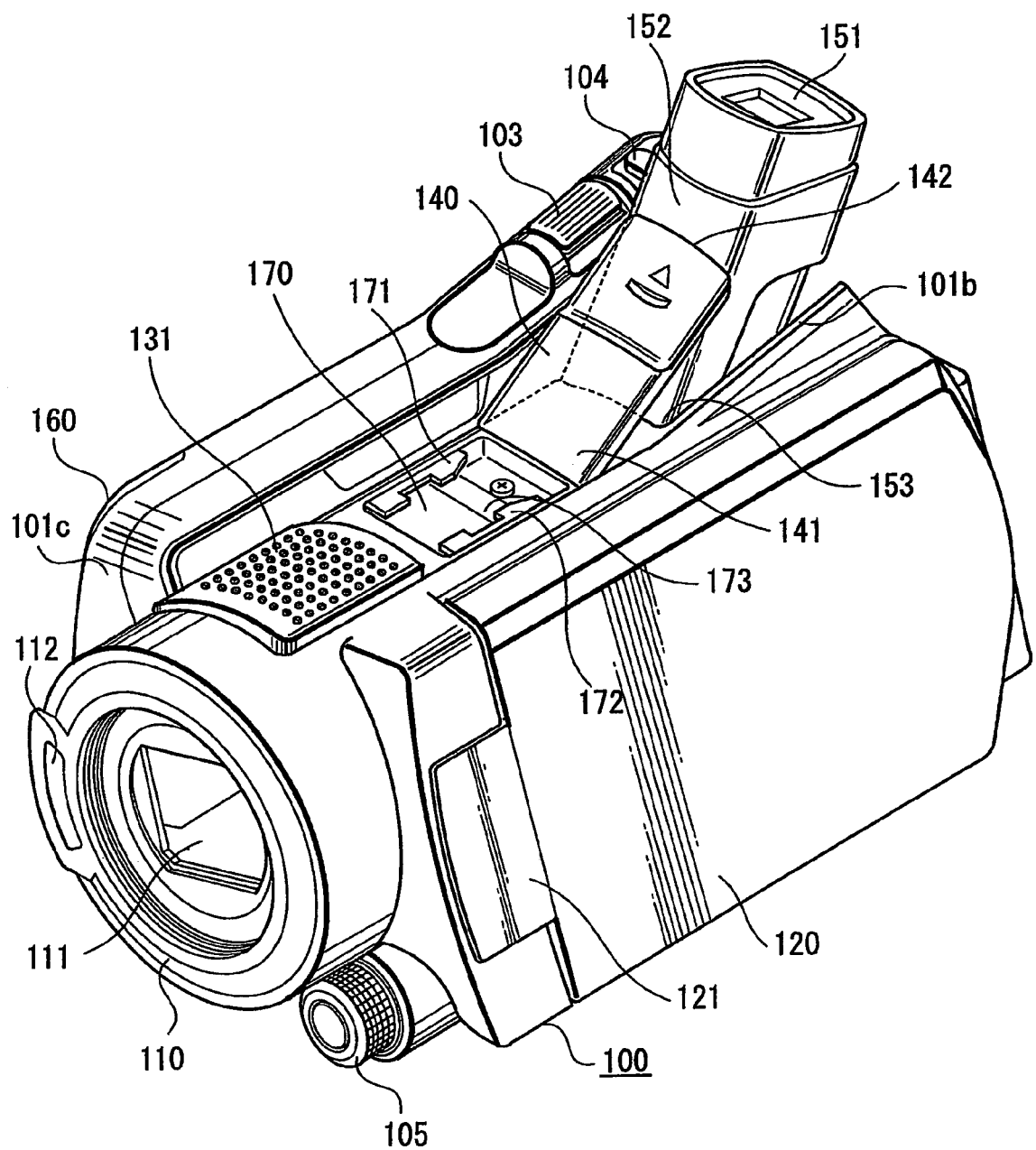
FIG. 4 is a perspective view illustrating the viewfinder in the raised configuration and the accessory shoe cover in the opened configuration of the camera apparatus according to an embodiment of the invention.

An accessory shoe 170 is arranged beneath the accessory shoe cover 140. The accessory shoe 170 is a mounting section of the camera apparatus to which various accessories are attached, and also includes contact points for power supply via which the camera apparatus communicates with the attached accessories. FIGS. 3 and 4 illustrate configurations in which the accessory shoe 170 is exposed when the accessory shoe cover 140 is open.

As shown in FIG. 3, metal shoe holders 171,172 are arranged in parallel with each other in the accessory shoe 170, and an accessory is fitted into a position sandwiched between the two holders 171, 172. A contact point covering unit 173 is located at a position surrounded by the holders 171, 172, and the contact points are provided beneath the covered position, via which the camera apparatus communicates with the attached accessories and the power is optionally supplied.

A preferable example of the accessory includes a device that can be attached to the main body 101 in a foreside direction thereof, such as a microphone having an excellent directivity and a lighting device (video light).

FIG. 3 illustrates, for example, the camera apparatus with a microphone 500 separately provided as an accessory. The microphone 500 includes a shoe connector 502 at a lower end of a leg 501, and the shoe connector 502 is fitted into the position between the metal holders 171, 172 of the accessory shoe 170. The shoe connector 502 fitted is then slightly slid toward the foreside of the main body 101 such that the microphone 500 is fixed to a prescribed position. In this configuration, the contact points, not shown, arranged beneath the contact point covering unit 173 are brought into contact with the contact points on the shoe connector 502 of the microphone 500 such that the camera apparatus communicates with the microphone 500 while the power is optionally supplied. A mechanism to open and close the accessory shoe cover 140 to cover the accessory shoe 170 will be described later.

Figure 21:
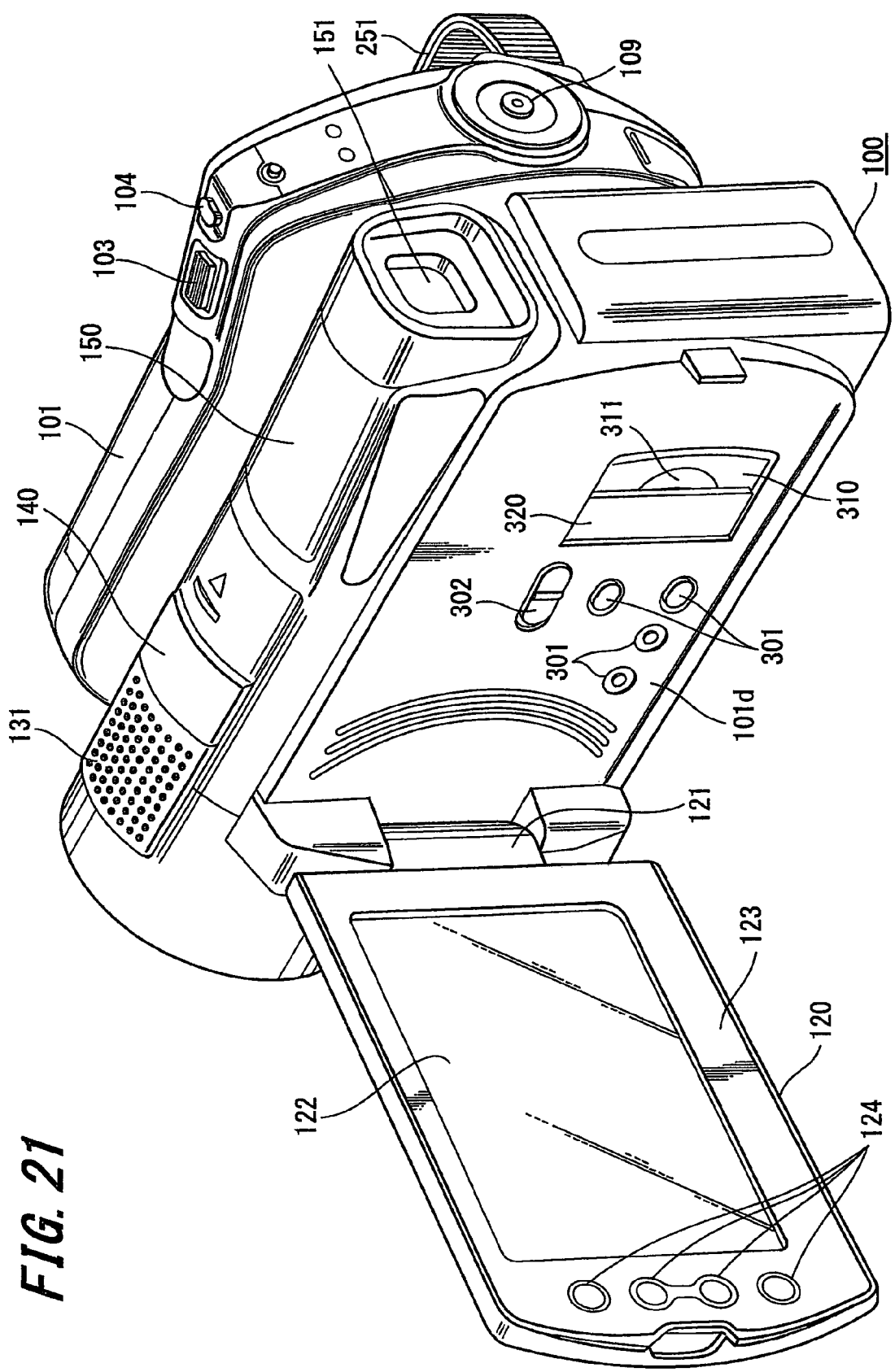
FIG. 21 is a perspective view illustrating one example of a display panel of the camera apparatus in an open configuration according to an embodiment of the invention.

Referring back to illustration of FIG. 1, the main body 101 on the right side of the viewfinder 150 includes a zoom lever 103 and an operation button 104 in viewing from the rear side of the video camera apparatus 100. The zoom lever 103 is used for adjusting magnification of a zoom lens capturing images of subjects. The operation button 104 is used as a shutter button that gives an instruction to capture static images. As shown in FIG. 21, a recording button 109 that gives an instruction to capture dynamic images is arranged on the rear end surface of the main body 101.

An adjusting dial 105 is arranged below the lens tube 110 adjacent to the foreside of the main body 101, and adjustments such as focus adjustment in capturing images of subjects can be conducted by turning the adjusting dial 105.

In the video camera apparatus 100 of the embodiment, a terminal arrangement unit 230 covered with a terminal cover 160 is provided along a curved surface of an edge portion 101c of the main body 101 on the right side of the lens tube 110. The terminal arrangement unit 230 will be described later with reference to FIG. 15.

Next, the accessory shoe cover arranged on the upper surface 101a of the main body 101 is described.

The accessory shoe cover 140 of the embodiment is arranged in the gap between the microphone 131 and the viewfinder 150 on the upper surface 101a of the main body 101. As can be clear from FIG. 1 illustrating the accessory shoe cover 140 in the closed configuration and FIG. 3 illustrating the accessory shoe cover 140 in the open configuration, the accessory shoe cover 140 is opened by sliding it in a rear side direction of the accessory shoe cover in the closed configuration. That is, the accessory shoe cover 140 opens by sliding it towards the viewfinder 150 side. In this case, a user manually slides to open or close the accessory shoe cover 140 with his/her fingers. To facilitate opening and closing of the accessory shoe cover 140, a projection 143 is provided approximately in the center of the accessory shoe cover 140. When sliding towards the rear side to open the accessory shoe cover 140, the accessory shoe cover 140 is placed on the upper surface 152 of the viewfinder 150 as shown in FIG. 3.

In the video camera apparatus 100 of the embodiment, the eyepiece 151 can be raised by turning the viewfinder 150, as shown in FIG. 2. Accordingly, the accessory shoe cover 140, which is slid to open as shown in FIG. 4, is opened by turning on a foreside of the viewfinder 150 as the turning fulcrum.

Figure 6:
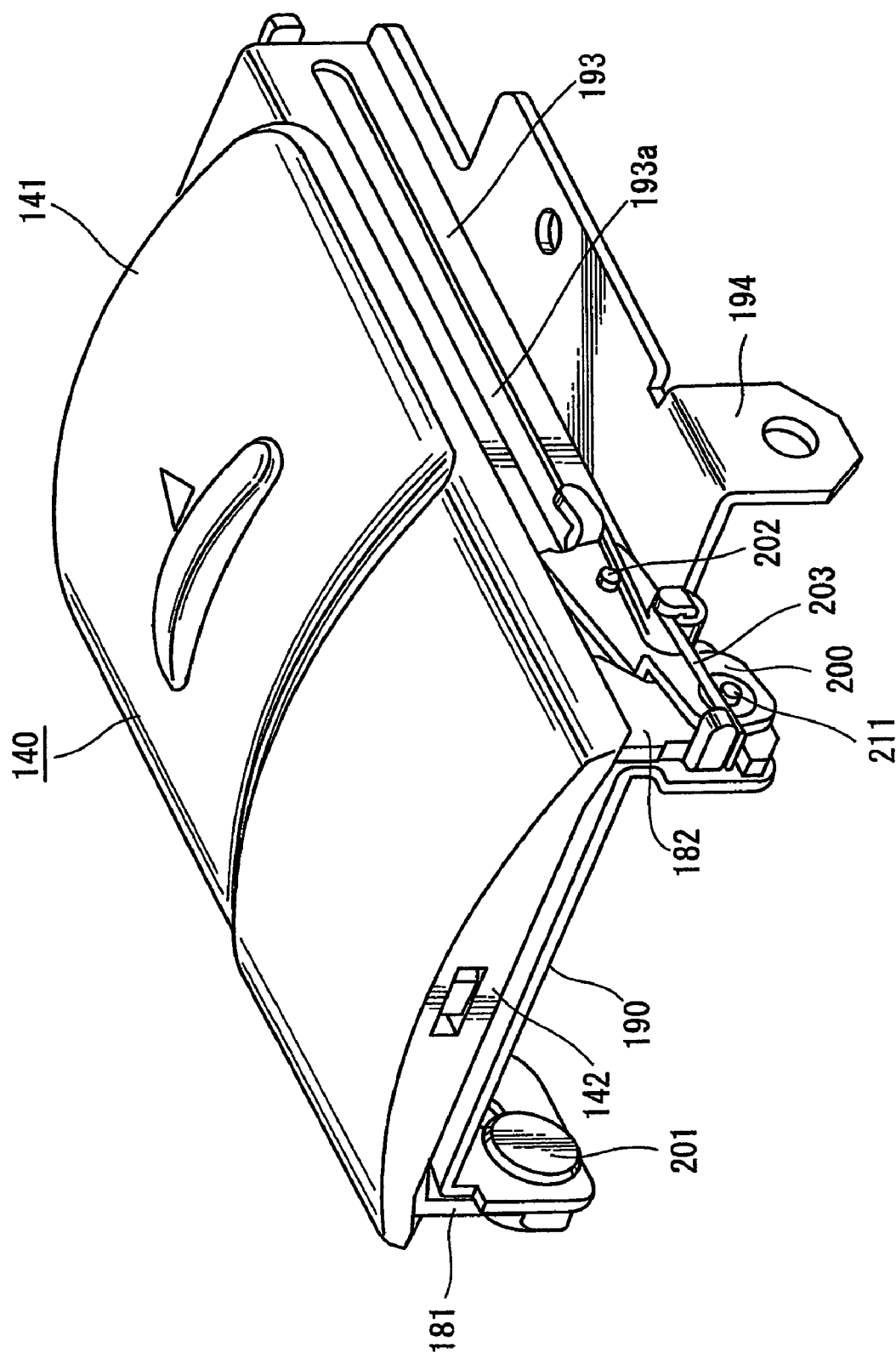
FIG. 6 is a perspective view illustrating one example of the accessory shoe cover of the camera apparatus and its moving mechanism according to an embodiment of the invention.
Figure 13:
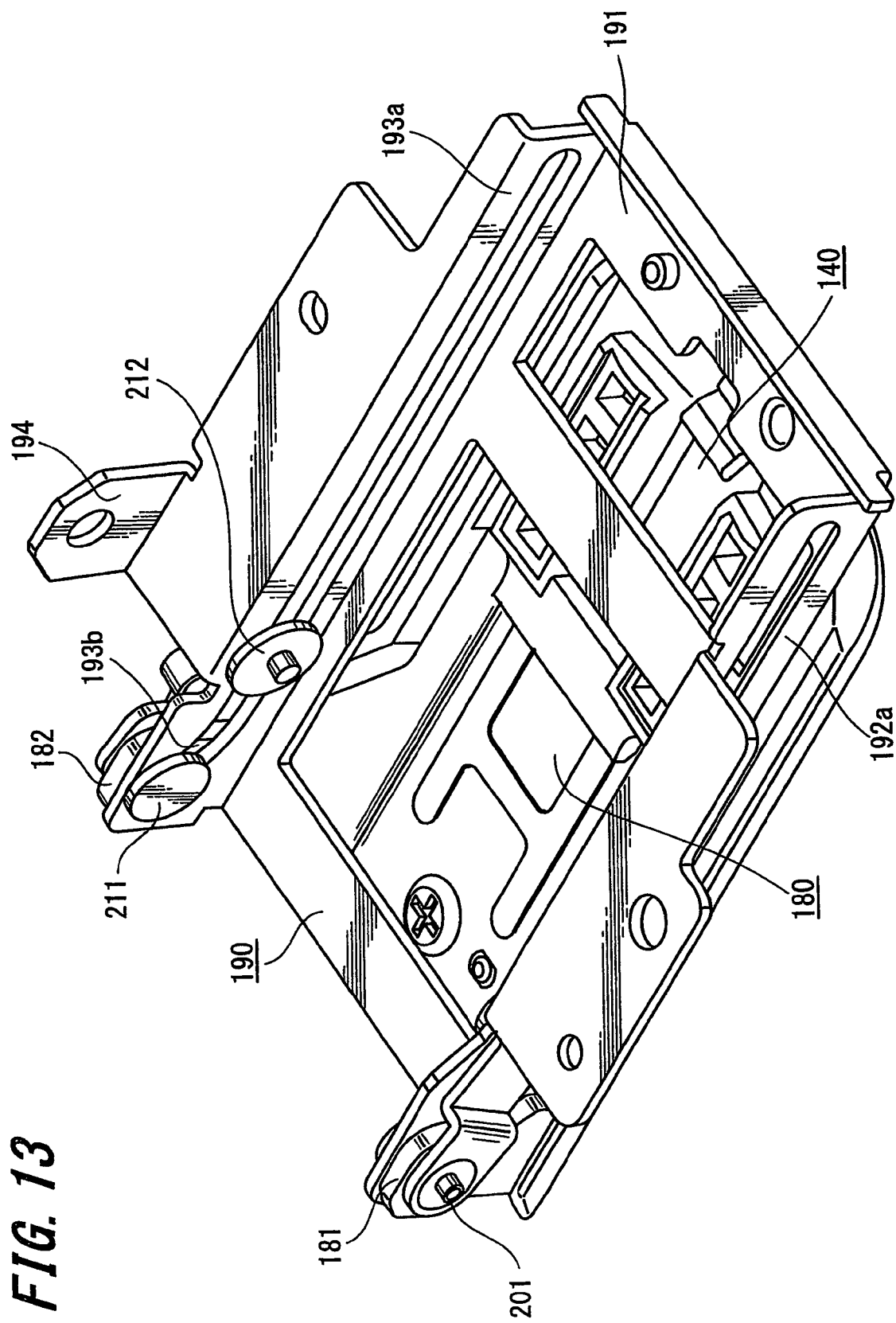
FIG. 13 is a perspective view of the accessory shoe cover and its moving mechanism of FIG. 6 viewed from the bottom thereof.

FIG. 6 illustrates a mechanism to hold the accessory shoe cover 140. FIGS. 7 to 11 illustrate components of the mechanism, FIG. 12 is an exploded view thereof, and FIG. 13 is assembly view thereof viewed from the rear side of the assembly mechanism. The foreside of the accessory shoe cover 140 as shown in FIG. 6 is located to the foreside of the video camera apparatus 100. As shown in these drawings, such as in FIG. 6, members other than the accessory shoe cover 140 are arranged inside the main body 100 so that the members are invisible from an external appearance of the video camera apparatus 100.

Figure 7:
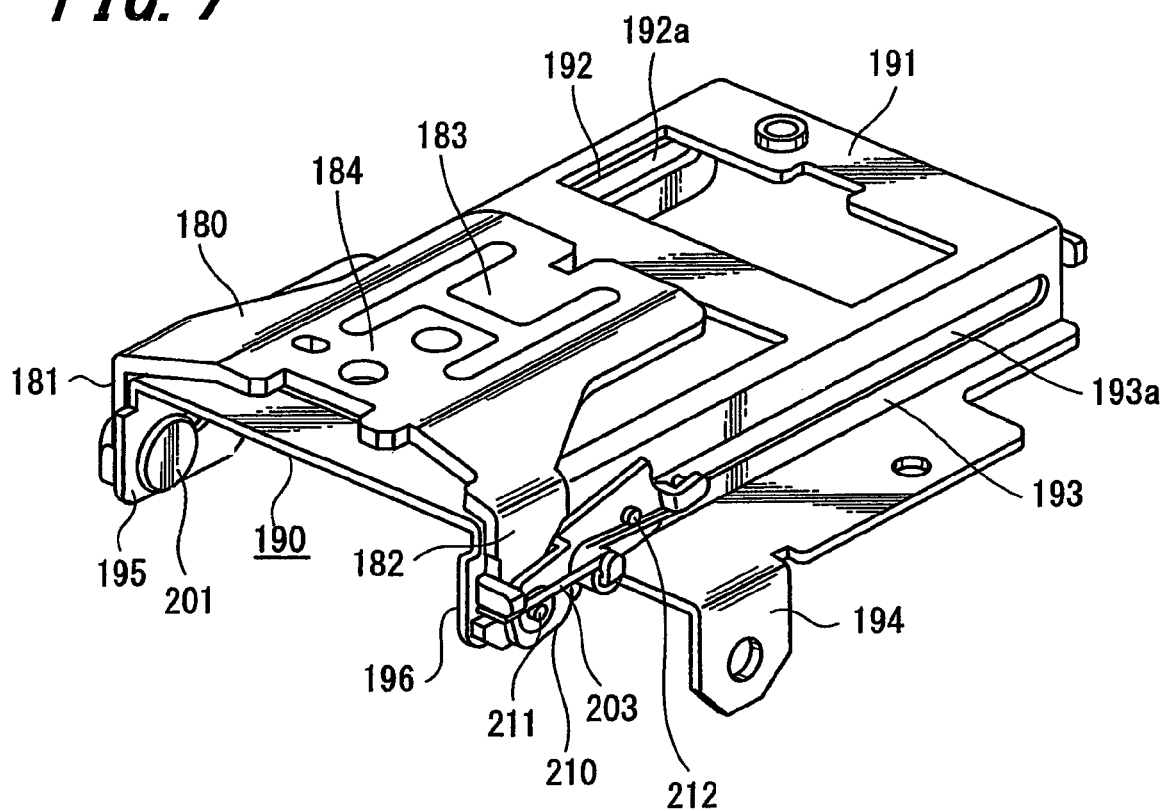
FIG. 7 is a perspective view illustrating one example of the moving mechanism of the accessory shoe cover in the camera apparatus according to an embodiment of the invention.
Figure 9:
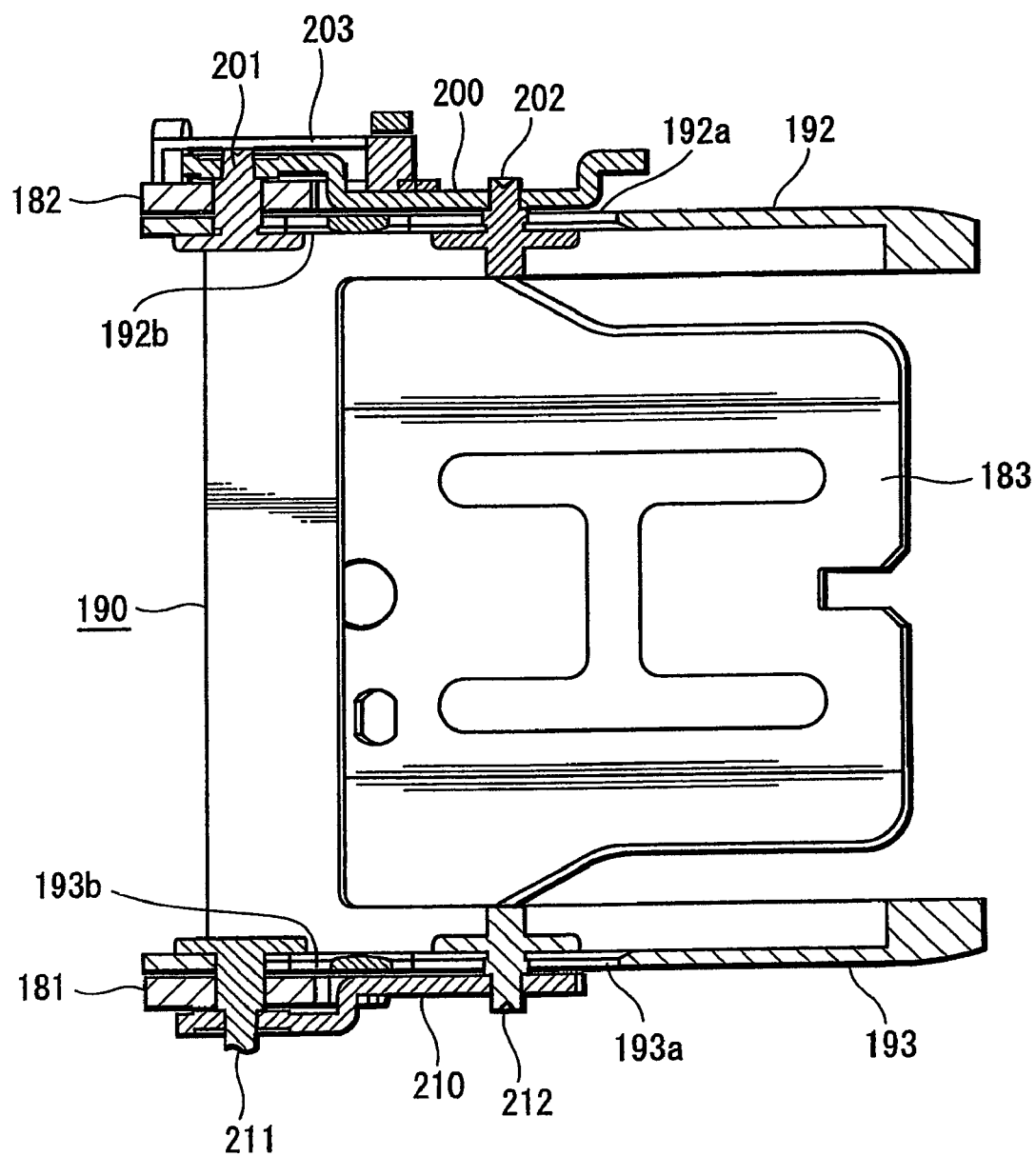
FIG. 9 is a cross sectional view along IX to IX of the moving mechanism of the accessory shoe cover as shown in FIG. 8.
Figure 10:
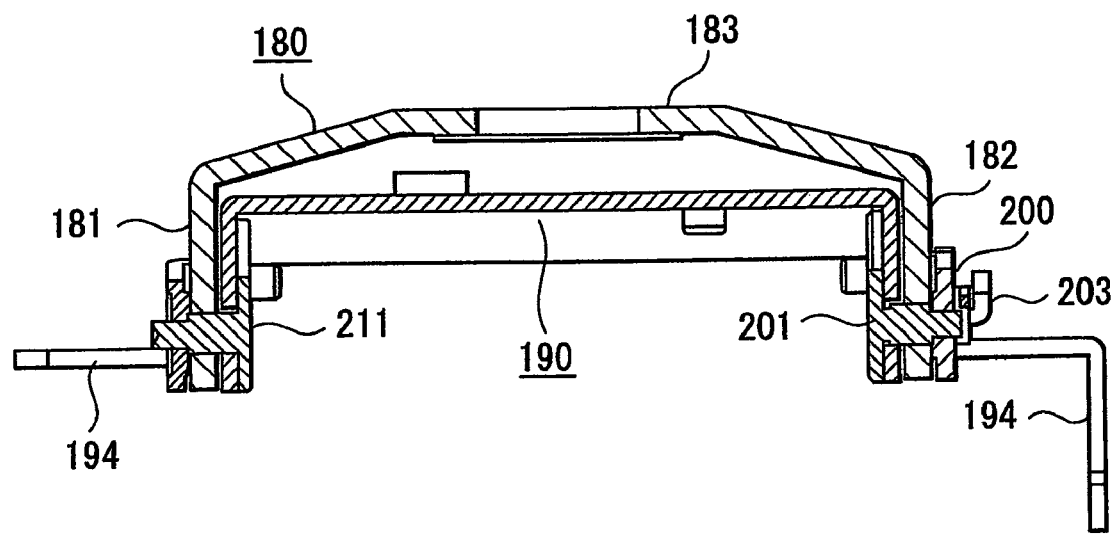
FIG. 10 is a cross sectional view along X to X of the moving mechanism of the accessory shoe cover as shown in FIG. 8.
Figure 11:
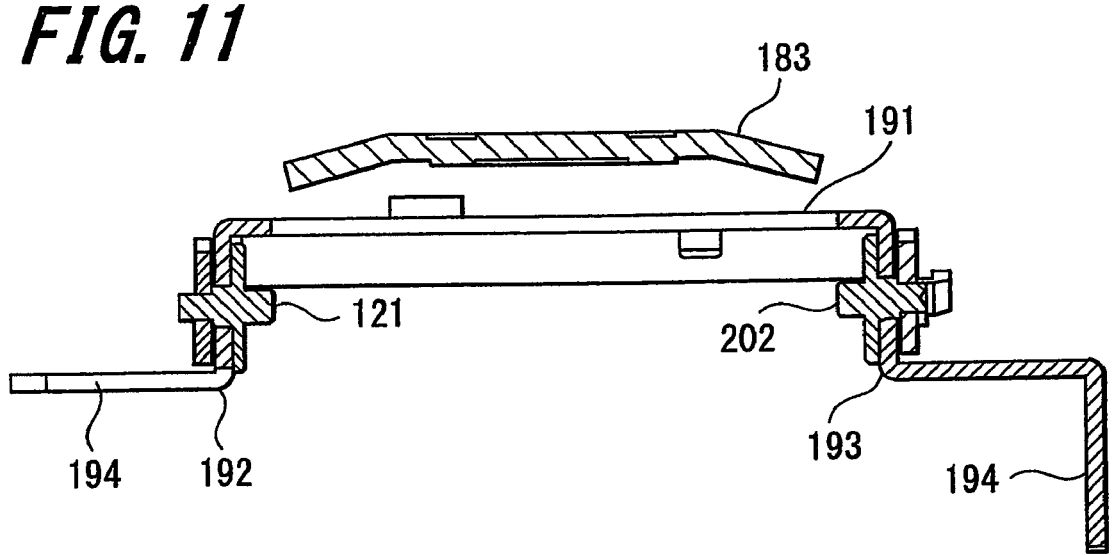
FIG. 11 is a cross sectional view along XI to XI of the moving mechanism of the accessory shoe cover as shown in FIG. 8.

The accessory shoe cover 140 is fixed on a cover fixing member 180, which slides horizontally along sliding grooves 192a, 193a in left and right side surfaces 192, 193 of a sliding member 190. As shown in FIG. 7, the cover fixing member 180 includes leg portions 181, 182 on the left and right sides thereof, and the accessory shoe cover 140 is threadably mounted on a flat plate 183 via a screw hole 184 in the center of the flat plate 183 that connects the leg portions 181, 182. As shown in FIG. 12, the leg portions 181, 182 of the cover fixing member 180 are mounted with shaft members 201, 211 slotted into the sliding grooves 192a, 193a in the left and right surfaces of the sliding member 190. The left and right shaft members 201, 211 are fixed to auxiliary plates 200, 210, which are also fixed with another shaft members 202, 212, slotted into the grooves 192a, 193a. As shown in FIG. 12, the auxiliary plate 200 includes holes 210a, 210b that are allowed to pass through the shaft members 201, 202, and the auxiliary plate 210 includes holes 200a, 200b that are allowed to pass through the shaft members 211, 212. FIG. 9 is a cross sectional view illustrating four shaft members 201, 202, 211, 212 that are allowed to pass through the sliding grooves 192a, 193a so that the four shaft members 201, 202, 211, 212 are fixed to the side surfaces 192,193 of the sliding member 190. FIG. 10 is a vertical cross-sectional view cut along positions of the shaft members 201, 211, and FIG. 11 is a vertical cross-sectional view cut along positions of the shaft members 202, 212. As can be clear from the aforementioned cross sectional views, the four shaft members 201, 202, 211, 212 slidably fixed to the side surfaces 192,193 of the sliding member 190 via the sliding grooves 192a, 193a.

The right leg 181 is connected to the sliding member 190 by allowing the two shaft members 201, 202 to pass through the sliding groove 192a in the right side surface 192 of the sliding member 190 whereas the left leg 182 is connected to the sliding member 190 by allowing the two shaft members 211, 212 to pass through the sliding groove 193a in the right side surface 193 of the sliding member 190. Accordingly, the cover fixing member 180 is pivotally supported by the four shaft members 201, 202, 211, 212 such that the cover fixing member 180 and the accessory shoe cover 140 fixed thereto can securely slide along the sliding grooves 182a, 193a.

Since the cover fixing member 180 to which the accessory shoe cover 140 is fixed is pivotally supported by the shaft members 201, 211, the cover fixing member 180 is turned around the shaft members 201, 211 as the turning center. As shown in FIG. 7, a spring 203 is arranged between the leg 181 of the cover fixing member 180 and the auxiliary plate 211, such that spring force of the spring 203 can hold a turning position of the accessory shoe cover 140 horizontal. When force is applied to raise a rear end 142 of the horizontally arranged accessory shoe cover 140, the accessory shoe cover 140 turns against the spring force of the spring 203.

Figure 8:
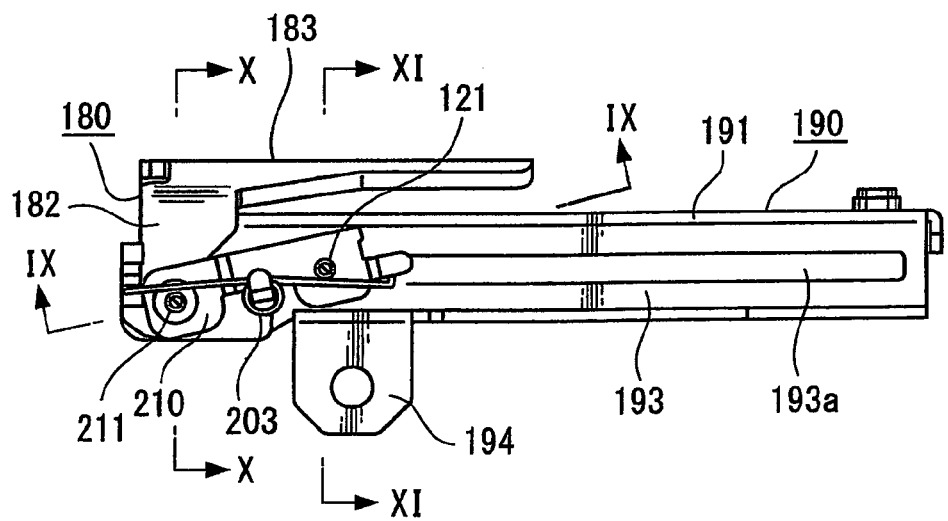
FIG. 8 is a side view illustrating one example of the moving mechanism of the accessory shoe cover in the camera apparatus according to an embodiment of the invention.

As shown in an exploded view of FIG. 12, groove ends 192b, 193b at foresides of the sliding grooves 192a, 193a of the sliding member 190, are slightly bent downwardly towards the foresides of the sliding member 190. In the cover fixing member 180 in the closed configuration, the legs 181, 182 of the cover fixing member 180 are located at the groove ends 192b, 193b having downwardly bent shapes. The position of the cover fixing member 180 in FIGS. 7 and 8 shows that of the cover fixing member 180 in the closed configuration. Specifically, the legs 181, 182 of the cover fixing member 180 are located at the groove ends 192b, 193b having downwardly bent shapes.

When the accessory shoe cover 140 in the closed configuration, the accessory shoe cover 140 is shifted to a slightly downward position; whereas when the accessory shoe cover 140 slides to open from the closed position, the accessory shoe cover 140 slides to a slightly upper position from the closed position and moves in parallel towards the rear side of the accessory shoe cover 140.

A flat plate 191 connecting the left and right side surfaces 192, 193 of the sliding member 190 includes a quadrilateral opening 191a, inside of which the accessory shoe 170 shown in FIG. 3 and FIG.4 is arranged. The side surfaces 192, 193 of the sliding member 190 are further extended outwardly to have an extended fixing portion 194. The extended fixing portion 194 includes a screw hole 194 through which a screw fixates the sliding member 190 to the main body 101.

FIG. 5 illustrates the accessory shoe cover 140 supported by the aforementioned mechanism that slides on the upper surface 101a of the main body of the video camera apparatus 100. FIG. 5A shows the accessory shoe cover 140 in the closed configuration. A front end 141 of the accessory shoe cover 140 in the closed configuration is located adjacent to the microphone 131, and a front end 142 thereof is located adjacent to the viewfinder 150. In the accessory shoe cover 140 in the closed configuration, an upper surface of the accessory shoe cover 140 and the upper surface 101a of the main body are on the same level. The closed configuration of the accessory shoe cover 140 shows a position of the cover fixing member 180 in relation to the sliding member 190 as shown in FIGS. 6 to 13, in which the shaft members 201, 211 are placed in the downwardly bent groove ends 192b, 193b.

FIG. 5B shows the accessory shoe cover 140 slightly opened from the closed position. In this state, the shaft members 201, 211 slide in a slightly upward direction along the horizontally extended sliding grooves 192a, 193a. However, although the shaft members 201, 211 slide in an upward direction as shown in FIG. 5B, the accessory shoe cover 140 is still horizontally held due to an action of the spring 203 shown in FIG. 6. FIG. 5B is a side view of the accessory shoe cover configuration illustrating the cover fixing member 180 that has been appeared when the accessory shoe cover is open.

FIG. 5C illustrates a configuration of the accessory shoe cover 140 that is opened from the configuration thereof in FIG. 5B. In this configuration, the accessory shoe cover 140 slightly raised slides along the upper surface 152 of the viewfinder 150 arranged behind thereof. Since the upper surface 152 has a slightly raised and inclined shape, the accessory shoe cover 140 turns on the front end 141 thereof as the turning fulcrum such that the rear end 142 thereof is slightly raised.

As shown in FIG. 5C, when the accessory shoe cover 140 is open, an attaching portion of the accessory shoe 170 is exposed so as to attach various accessories to the accessory shoe 170.

FIG. 5D is a view illustrating a configuration in which the accessory shoe cover 140 is open when the viewfinder 150 has been turned to raise the eyepiece 151. In this state, although the rear end 142 of the accessory shoe cover 140 has contacted with the upper surface 152 of the viewfinder 150 before the accessory shoe cover 140 has opened, the accessory shoe cover 140 also turns to raise the rear end 142 thereof. Thus, the attaching portion of the accessory shoe 170 can be fully open. FIG. 5D shows an example configuration in which the microphone 500 is attached to the accessory shoe 170.

In the embodiment of the video camera apparatus 100, the accessory shoe 170 is adequately arranged in the gap between the microphone 130 and the viewfinder 150. The accessory shoe cover 140 slides to open and close horizontally to the accessory shoe 170 that is placed in the limited gap. However, since the accessory shoe cover 140 turns along the shape of the viewfinder 150 when sliding to open in the backward direction thereof, the accessory shoe cover 140 can be open even though the eyepiece 151 of the viewfinder 150 has been raised. Thus, the accessory shoe cover 140, which is used as a cover member capable of opening and closing the limited gap, can be adequately arranged.

With this embodiment, since the accessory shoe cover 140 slightly lowers the position thereof to make level of the surface of the accessory shoe cover 140 approximately the same with the surface of the main body when the accessory shoe cover 140 is closed, the accessory shoe cover 140 in the closed configuration is fixed to an excellent position thereof.

As shown in FIGS. 5C, 5D, when the accessory shoe cover 140 is open, a lower surface of the rear end 142 of the accessory shoe cover 140 is brought into contact with the upper surface 152 of the viewfinder 150. An elastic resin sheet or fiber sheet may be attached to the lower surface of the rear end 142 of the accessory shoe cover 140 so that the upper surface 152 of the viewfinder 150 will not be damaged when the accessory shoe cover 150 and the viewfinder 150 are in contact.

Next, the terminal cover 160 adjacent to the lens tube 110 of the video camera apparatus 100 and periphery thereof will be illustrated.

Figure 14:
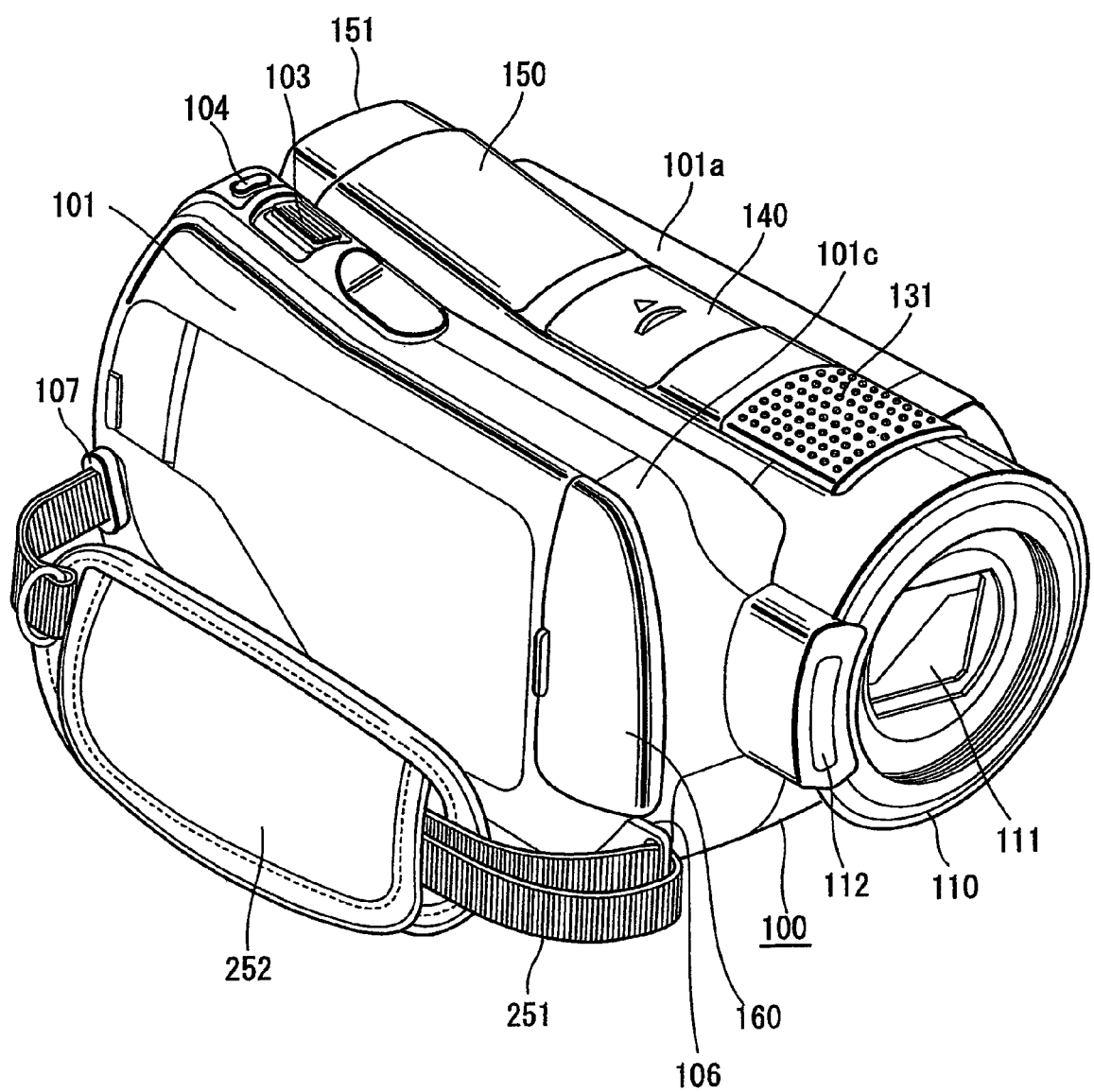
FIG. 14 is a perspective view illustrating another example of a camera apparatus according to an embodiment of the invention.
Figure 15:
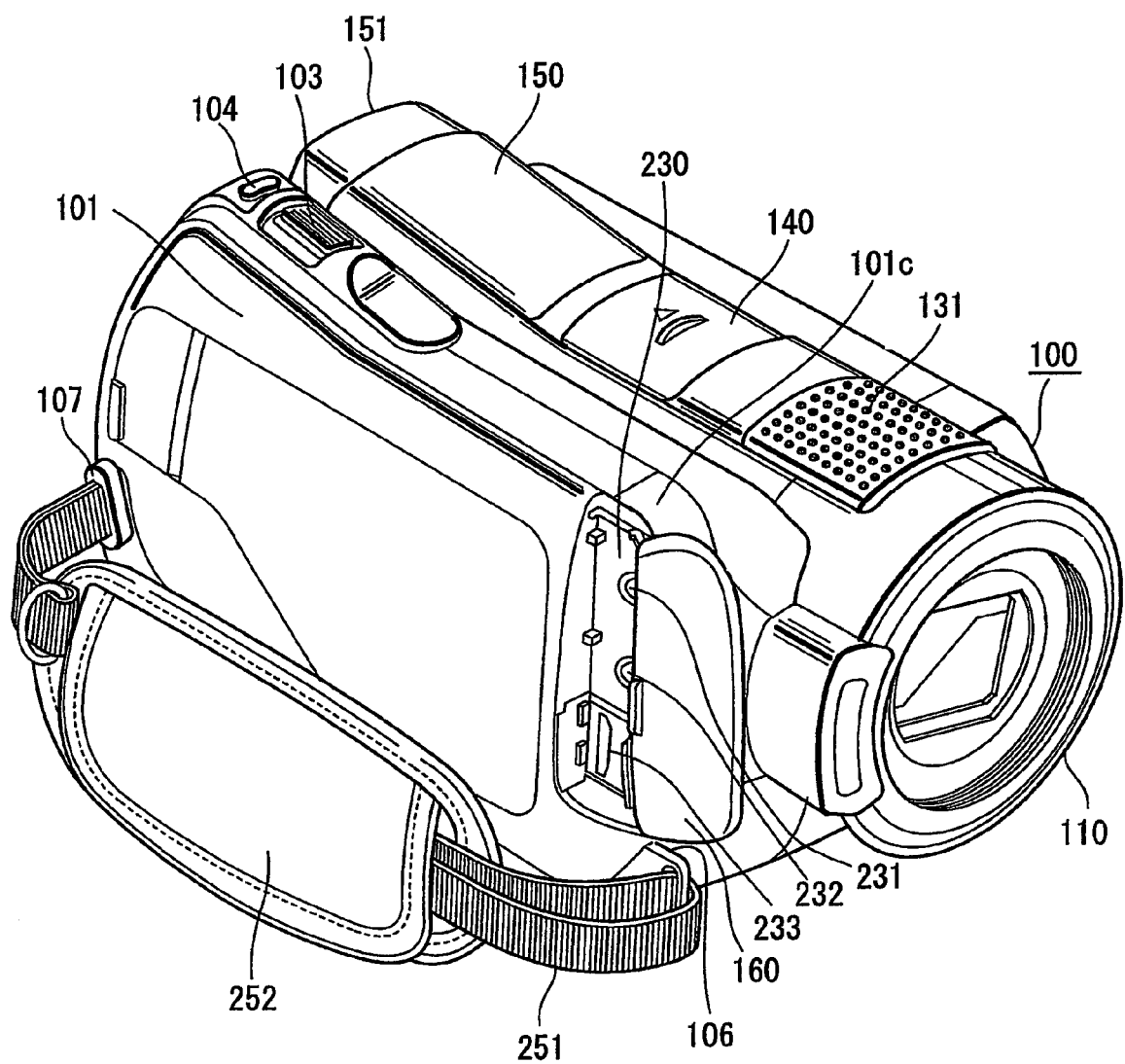
FIG. 15 is a perspective view illustrating one example of a terminal cover of the camera apparatus in an open configuration according to an embodiment of the invention.

FIG. 14 illustrates the terminal cover 160 of the video camera apparatus 100 in the closed configuration whereas FIG. 15 illustrates that in the opened configuration.

As shown in FIGS. 14 and 15, the terminal cover 160 is arranged closed to the right front surface of the edge portion 101c of the main body 101, and the terminal arrangement unit 230 is located beneath the terminal cover 160 to be covered. Thus, the terminal cover 160 is used as a cover when the terminal arrangement unit is not in use. The terminal cover 160 is open when plugs attached to cords of various apparatuses are connected to the terminals. The user can manually open and close the terminal cover 160.

The terminal arrangement unit 230 is exposed, as shown in FIG. 15, when the terminal cover 160 is open. The terminal arrangement unit 230 includes a microphone terminal 231, a headphone terminal 232, and an HDMI terminal 233 vertically aligned thereon in the order from the above. The terminals 231, 232, 233 are, as shown in FIG. 15, arranged in a side surface direction; that is, arranged in a direction perpendicular to the longitudinal direction of the main body 101.

The microphone terminal 231 is used, when a separate microphone (not shown) is connected therewith, for receiving a sound signal input from the microphone. The headphone terminal 232 (not shown) is used to be connected with a headphone (not shown). Specifically, the headphone terminal 232 is used for outputting sound collected by the microphone 131 while capturing images of subjects by the video camera apparatus 100, or sound that have been already recorded with images.

An HDMI terminal 233 is used for outputting image signals and sound signals, and used as an output terminal for supplying the image signals and sound signals to imaging apparatuses such as a television receiver or video recorder. As shown in FIGS. 14 and 15, belt fixing portions 106, 107 to which a grip belt fixed are placed on the front and rear of the side surface of the main body 101 with the terminal arrangement unit 230.

When the terminal cover 160 is open from the closed position, the terminal cover 160 slides forward in parallel along the side surface of the main body 101 to reach a certain position, and turns along the curved surface of the edge portion 101c of the main body 101. The terminal cover 160 is located adjacent to the lens tube 110 when the terminal cover 160 is open and then turns as shown in FIG. 15.

Figure 16:
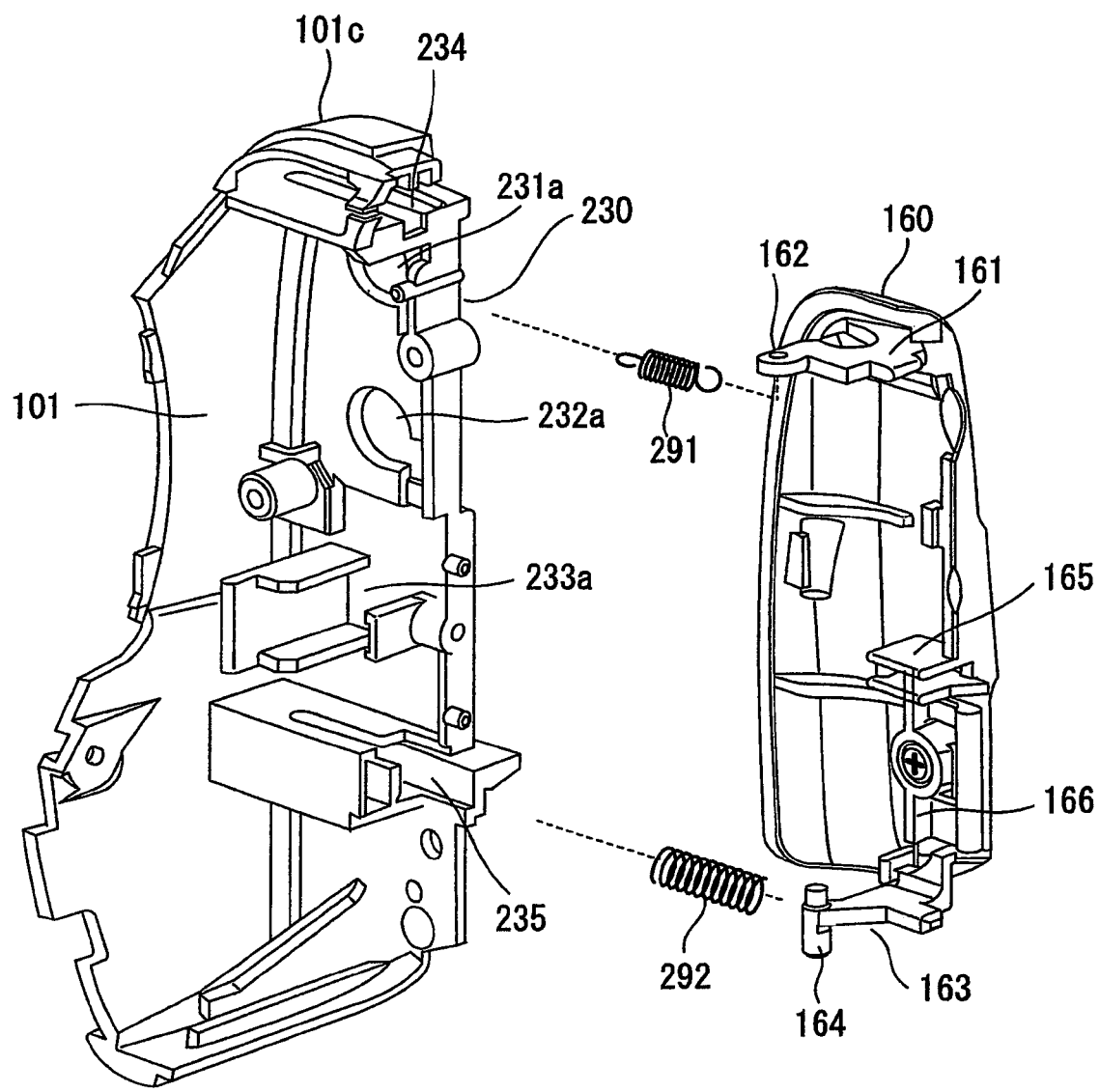
FIG. 16 is a partially exploded perspective view illustrating a rear side of the terminal cover according to an embodiment of the invention.
Figure 18A:
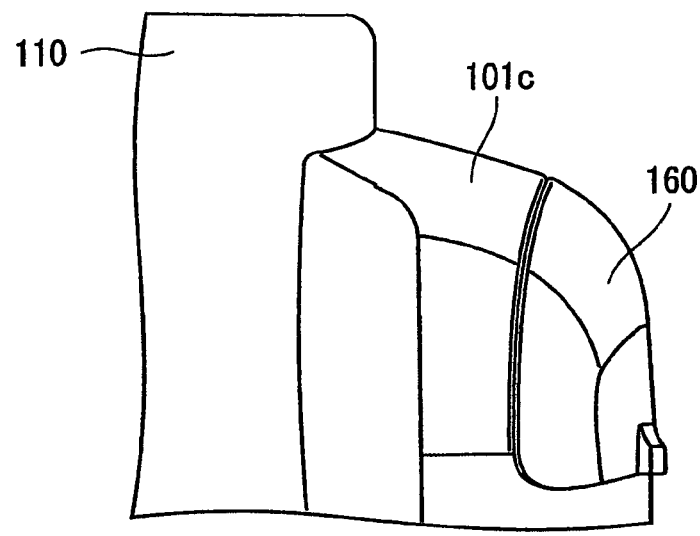
FIGS. 18A to 18C are top views each illustrating the terminal cover in open and closed configurations according to an embodiment of the invention.
Figure 18B:
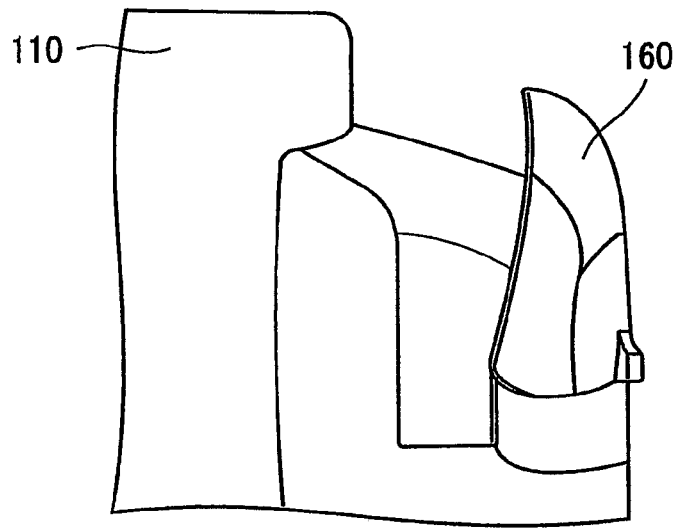
Figure 18C:
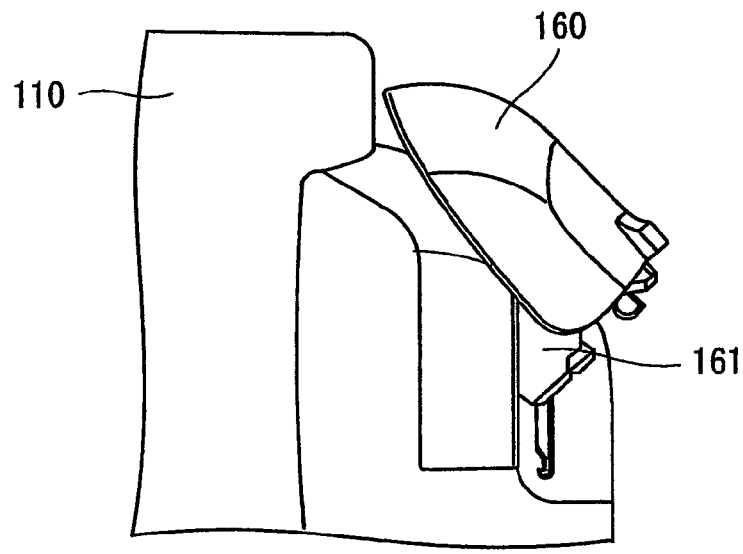

FIG. 16 is a view partially cut away the edge portion 101c of the main body 101 of this embodiment to show the terminal cover 160 from the rear surface side. FIG. 16 is a view showing the edge portion 101c partially cut away from the main body formed of synthetic resin. FIG. 16 shows the terminal arrangement unit 230 of the edge portion 101 to which components of the terminals 231, 232, 233 are unattached, but shows terminal arrangement portions 231a, 232a, 233a, to which the terminals 231, 232, 233 are connected, are formed.

As shown in FIG. 16, the terminal cover 160 includes a horizontal projection portion 161 attached to an upper side of the rear surface and a horizontal projection portion 163 attached to a lower side of the rear surface. An engaging hole 162 is provided in an end portion of the horizontal projection portion 161 attached to the upper side of the rear surface of the terminal cover 160. A turning fulcrum shaft 164 is provided on an end of the horizontal projection portion 163 attached to the lower side of the rear surface of the terminal cover 160. The rear side of the terminal cover 160 is provided with wall portions 165, 166 individually forming certain shapes. The end portion of the upper horizontal projection portion 161 is configured to fit into a groove portion 234 on the rear surface of the edge portion 101c of the main body 101; whereas the end portion of the lower horizontal projection portion 163 is configured to fit into a groove portion 235 on the rear surface of the edge portion 101c of the main body 101.

One end of an extension spring 291 is engaged with the engaging hole 162 while the upper and lower horizontal projection portions 161,163 are fitted into the respective grooves 234, 235. The other end of the extension spring 291 is engaged with the groove portion 234 of the main body 101.

The turning fulcrum shaft 164 on the end of the lower horizontal projection portion 163 is fitted into the groove portion 235. Subsequently, a compression spring 292 is arranged in the groove portion 235.

Figure 19A:
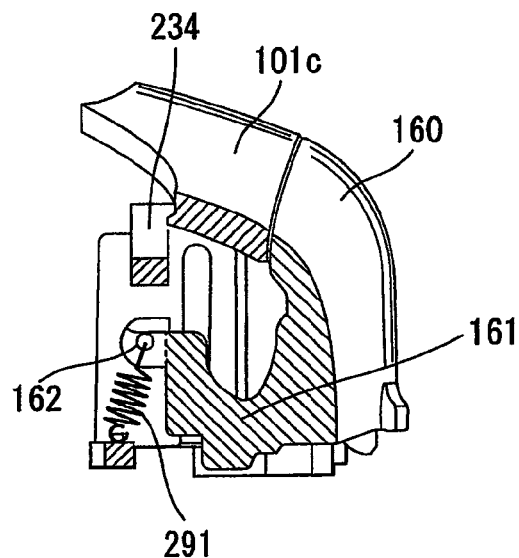
FIGS. 19A to 19C are cross sectional views each illustrating the terminal cover in open and closed configurations according to an embodiment of the invention.
Figure 19B:
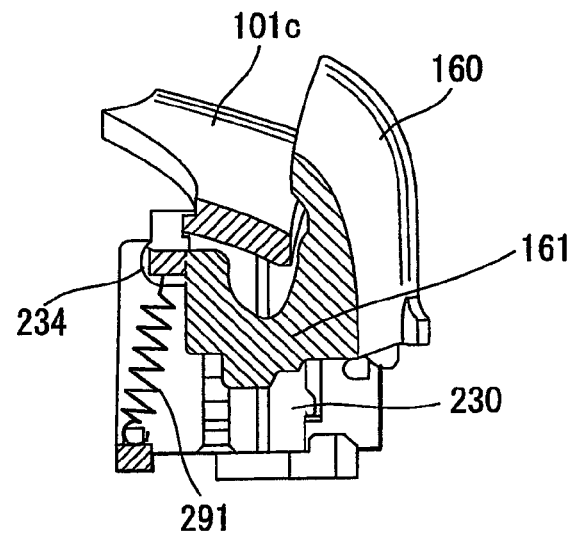
Figure 19C:
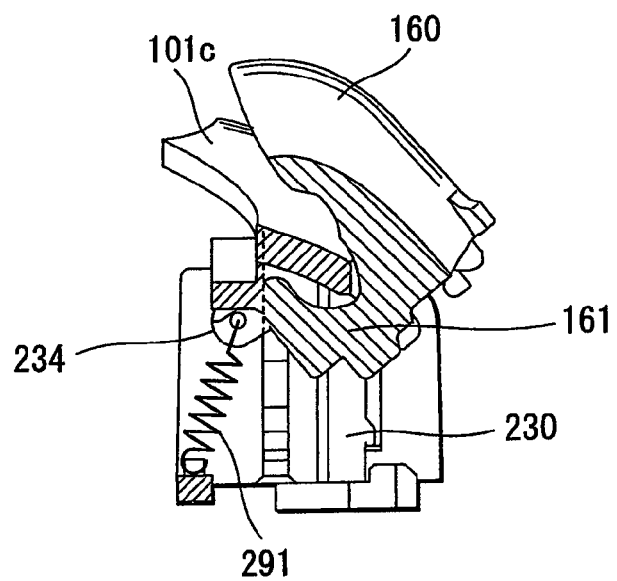
Figure 20A:
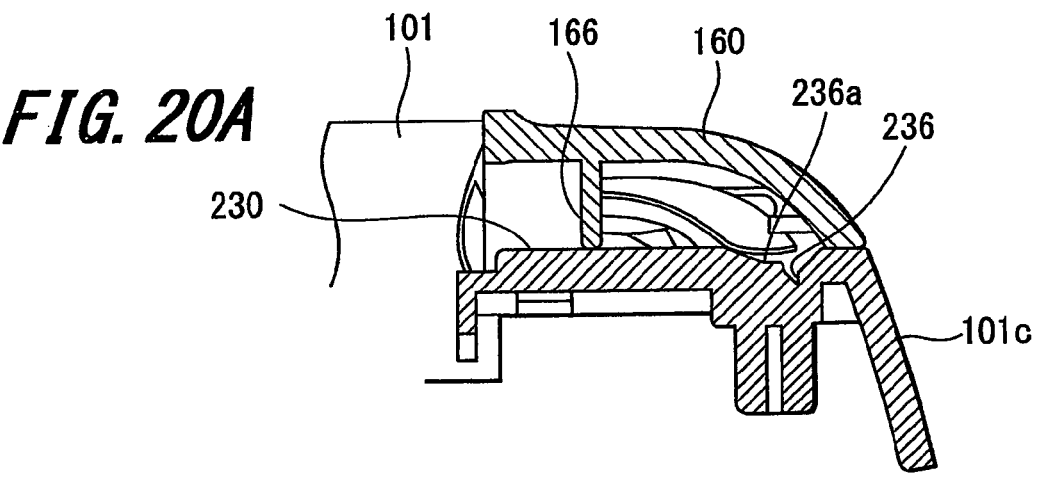
FIGS. 20A to 20C are cross sectional views each illustrating the terminal cover in open and closed configurations according to an embodiment of the invention differing from the cross sectional views of FIGS. 19A to 19C.
Figure 20B:
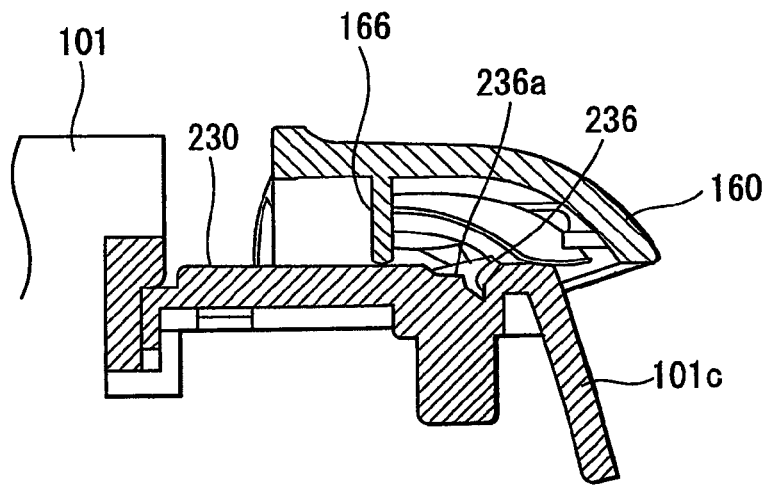
Figure 20C:
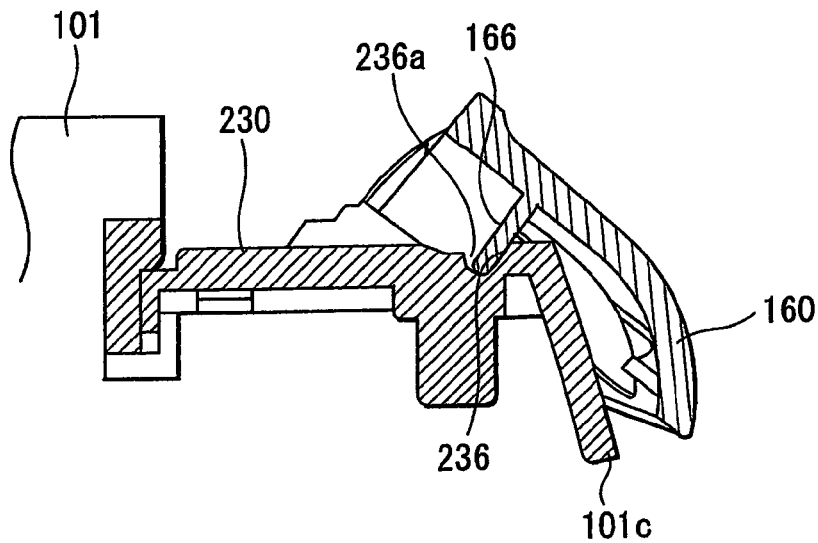

FIGS. 17 to 20 are views illustrating the terminal cover 160 in open and closed configurations. FIG. 17A, 17B, 17C are side views of the main body, FIG. 18A, 18B, 18C are top views of the terminal covers 160, FIG. 19A, 19B, 19C are sectional views of the groove portion 234, and FIG. 20 are other sectional views of the groove portion 234. FIGS. 20A, 20B, 20C are sectional views illustrating movements of the terminal cover 160 viewed from the bottom. FIGS. 17A, 18A, 19A illustrate the terminal cover 160 in the closed configuration, FIGS. 17B, 18B, 19B illustrate the terminal cover 160 in half-open configuration, and FIGS. 17C, 18C, 19C illustrate the terminal cover 160 in the full-open configuration.

In the opening and closing movements of the terminal cover 160, the upper horizontal projection portion 161 horizontally slides along the groove portion 234 until the terminal cover 160 opens a certain amount from the closed position thereof as shown in FIGS. 19A, 19B, 19C. The user may need sliding horizontally to open the terminal cover 160 against elastic force of the extension spring 291. However, since elastic force of the compression spring 292 arranged in the groove portion 235 (FIG. 16) acts in an opening direction, the user will use less physical force in opening the terminal cover 160.

Subsequently, when the upper horizontal projection portion 161 horizontally slides to the rearmost end of the groove portion 234; that is, when the upper horizontal projection portion 161 is in a position shown in FIG. 19B, extension force is applied to the engaging hole 162 of the upper horizontal projection portion 161.

With the applied force, the terminal cover 160 turns on the turning fulcrum shaft 164, which is fitted to the lower groove portion 235 as a center of turning, along the curved surface of the edge portion of the main body 101. Accordingly, the terminal cover 160 sufficiently opens to allow the plugs to be connected to the terminals 231, 232, 233, as shown in FIG. 17C.

When the terminal cover 160 closes as shown in FIG. 17A from the open position thereof as shown in FIG. 17C, due to the act of the compression spring 292 arranged in the groove portion 235 in FIG. 16, the terminal cover 160 moves in the closing direction with relatively small force, the terminal cover 160 is completely closed.

When the terminal cover 160 is a full-open configuration, the rear side wall portion 166 of the terminal cover 160 is fitted into a recess portion 236, which is provided with a projection 236a, as shown in FIG. 20C. Thus, the end of the wall portion 166 runs over the projection 236a to fit into all the way in the recess portion 236 just before the terminal cover 160 is fully opened. In this state, the recess portion 236 has worked as a locking member to stop turning of the terminal cover 160. Due to having the projection 236a on the recess portion 236, when the terminal cover 160 closes from the open position, the user may need move the terminal cover 160 in the closing direction with slightly stronger power, and the terminal cover 160 may remain opened when the terminal cover 160 is not deliberately moved.

According to the video camera apparatus 100, the terminal cover 160 horizontally slides to a certain amount, and subsequently turns along the curved surface of the edge portion 101c of the main body 101 when the terminal cover 160 is open. Thus, the opened terminal cover 160 will excellently be accommodated adjacent to the lens tube 110 without projecting from the end of the main body 101. If the terminal cover 160 only slides and will not turn, increased sliding amount of the terminal cover 160 may need to secure a certain opening amount, the opened terminal cover 160 will substantially project from the main body to be an obstacle.

Depending on the amount of projection, the terminal cover may be located in an angle of view of the lens in the lens tube to disturb capturing images of subjects; however, with this embodiment, the terminal cover 160 will turn to be placed adjacent to the lens tube 110, so that no such interference will occur in capturing images of subjects.

Next, a memory card holder of the video camera apparatus 100 and periphery thereof will be illustrated.

Figure 22:
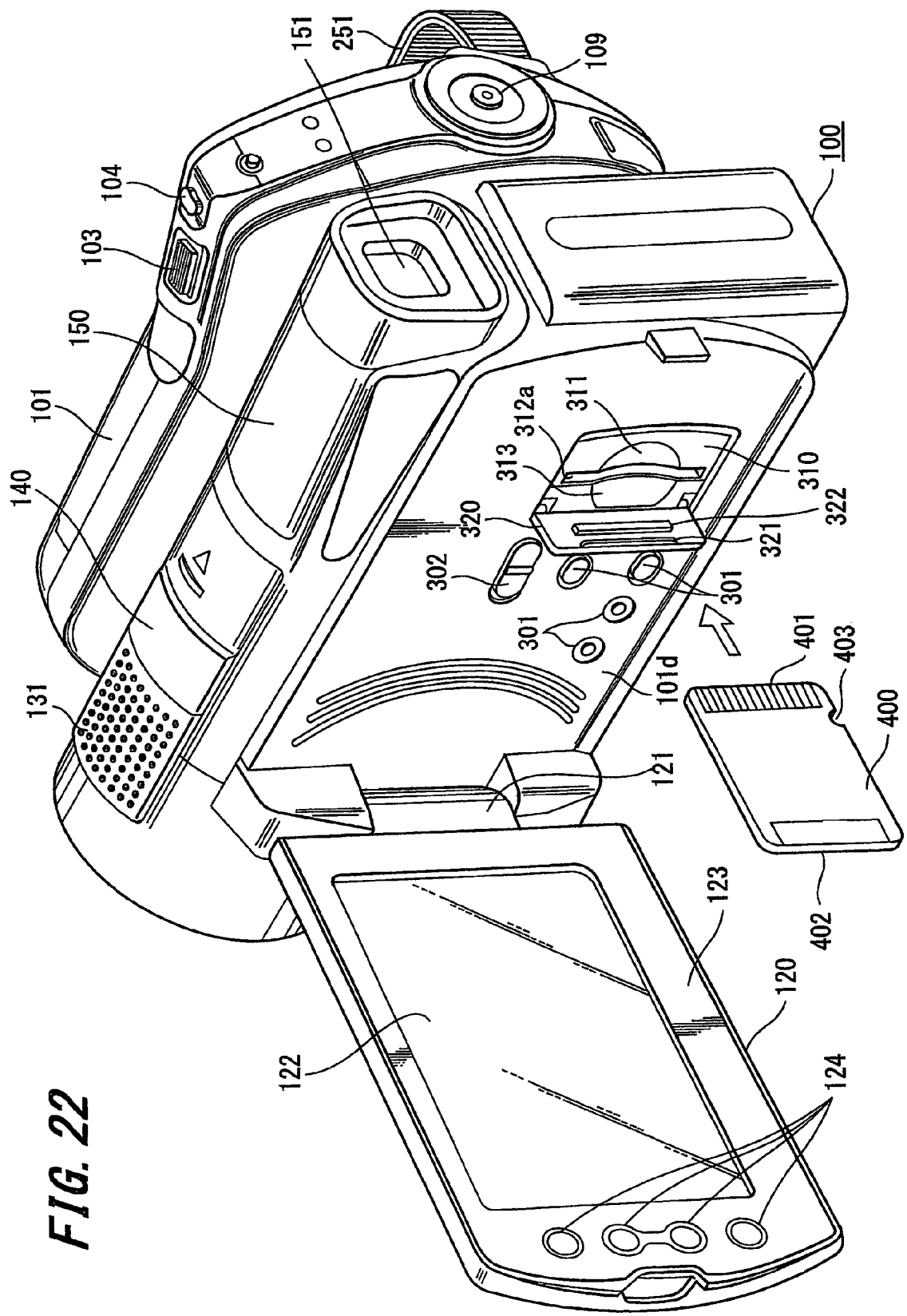
FIG. 22 is a perspective view illustrating one example of a memory card cover in an open configuration according to an embodiment of the invention.
Figure 23:
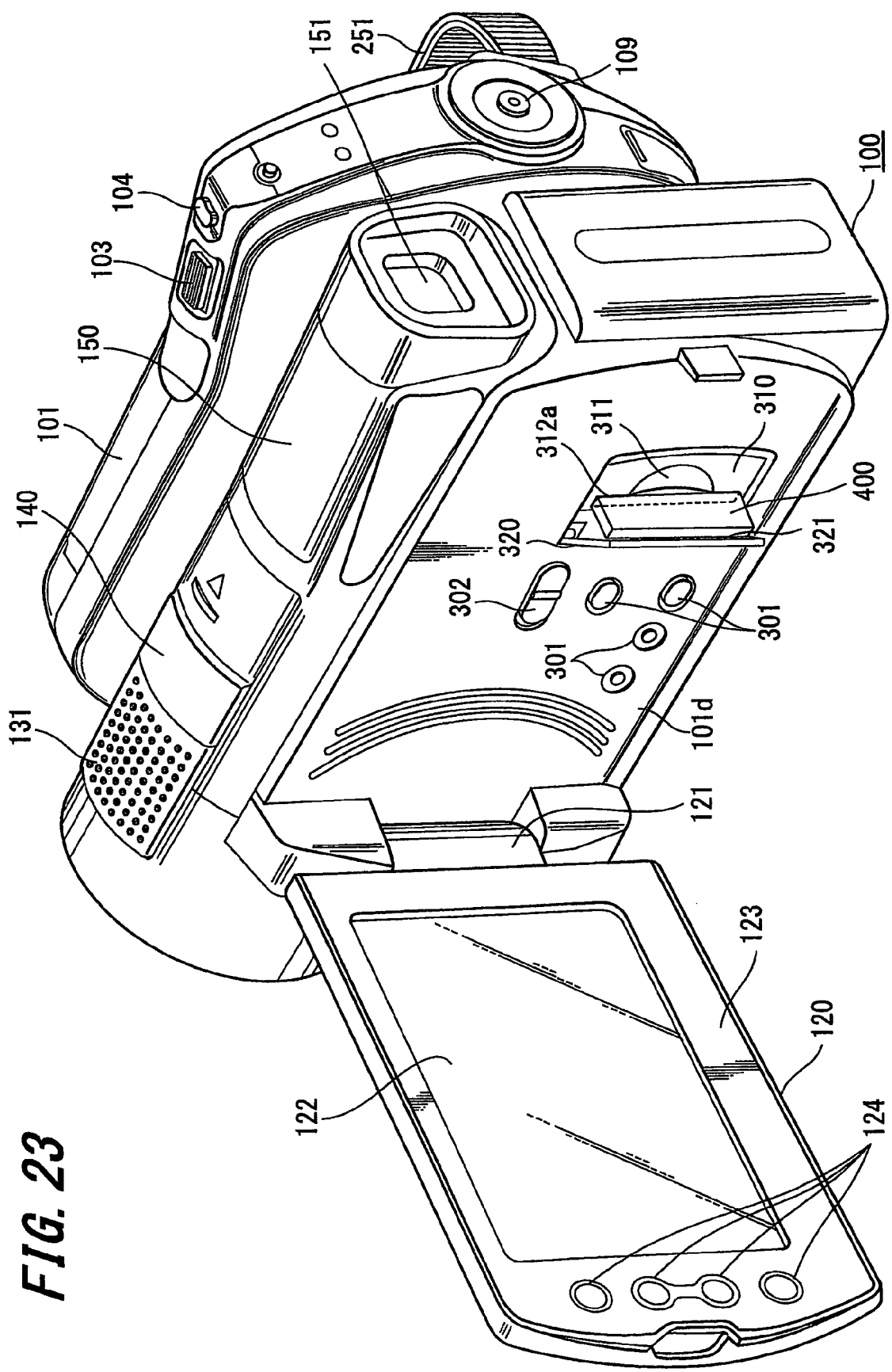
FIG. 23 is a perspective view illustrating one example of a memory card inserted into a slot but unlocked configuration according to an embodiment of the invention.

FIGS. 21 to 23 are views each illustrating the display panel unit 120 in an open configuration arranged on the left side of the video camera apparatus 100 according to an embodiment of the invention. The display panel unit 120 turns to open on a support unit 121 as the center of turning. The panel 122 to display images is attached to internal wall of the display panel unit 120. The panel 122 is located in a slightly recessed position from a frame unit 123 placed around the panel 122. Operation buttons 124 and the like are arranged on the frame unit 123. The panel 122 is formed as a touch panel, a surface of which the user can touch to activate various operations. Since the panel 122 is located in the slightly recessed position from the level of the frame unit 123, when a cover member 320 of a memory card opens, the cover member 320 will not contact with the frame unit 123, nor will it contact with the panel 122.

A memory card holder unit 310 is arranged on a right side surface 101d of the main body 101 that will be exposed when the display panel unit 120 has opened, and will be unexposed when the display panel unit 120 has closed. An operation button 301 and a slide switch 302 are arranged on the right side surface 101d of the main body to activate various operations.

The cover member 320 is provided with the memory cover holder unit 310 as shown in FIG. 21. The cover turns to open and close on the fulcrum as shown in FIGS. 22 and 23. The user can manually open and close the cover member 320.

In this embodiment, a memory card 400 attached to the memory card holder unit 310 has a planer shape, one end of which includes a contact portion 401. The memory card 400 is, as shown in FIG. 22, inserted into or removed from the memory card holder unit 310 in a vertical direction. As shown in FIG. 21, the cover member 320 can be closed either when the memory card 400 is completely inserted into the memory card holder unit 310, or when the memory card 400 is not inserted into the memory card holder unit 310. The memory card holder unit 310 includes a locking mechanism to lock the memory card 400 inserted into the memory card slot 312 so that the cover member 320 will not close when the memory card 400 is inserted therein and unlocked by the locking mechanism.

As can be clear from FIG. 22, semicircular recess portions 311, 313 are provided in both sides of the memory card slot 312 having a vertically oriented inlet 312a. The recess portions 311, 313 are provided for facilitating removal of the memory card 400 inserted in the memory card slot 312 so that the user can hold a rear end 402 of the memory card 400 with ease.

Figure 25:
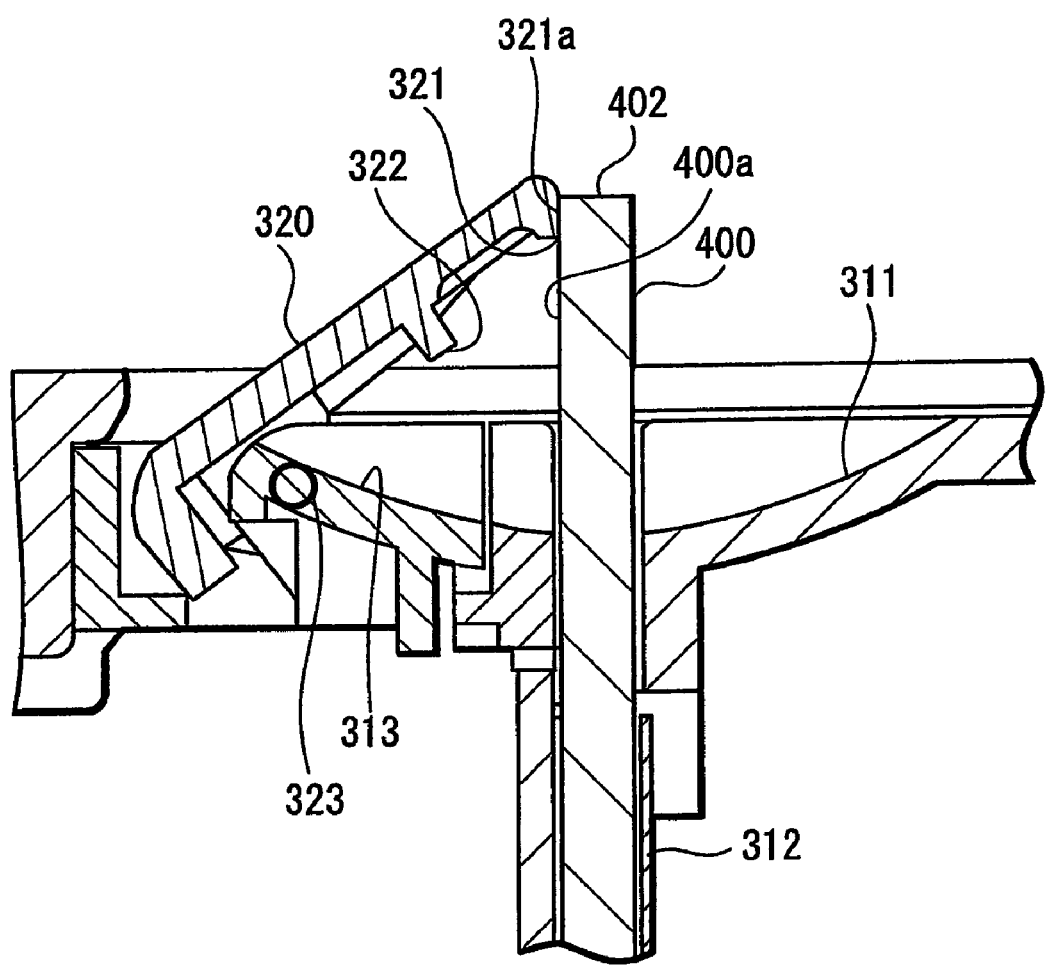
FIG. 25 is a cross sectional view illustrating an enlarged main portion of FIG. 24D.

As shown in FIG. 22, a ridge 321 is provided on an edge of the rear surface of the cover member 320. The ridge 321 includes a slope 321a as shown in FIG. 25. The slope 321a is an inclined surface of approximately 45 degrees such that a planer surface of the memory card 400 not completely inserted into the memory card slot 312 and the slope 321a are in parallel with each other. A ridge 322 is provided on the edge of the cover member 320 (see FIG. 24) such that the ridge 322 is spaced apart from and in parallel with the ridge 321. The width between the ridges 321 and 322 corresponds to the width of the memory card 400.

Thus, since the ridge 321 having the slope 321a is provided on the edge of the rear surface of the cover member 320, the cover member 320 will not close when the memory card 400 is inserted into the memory card slot 312 but unlocked.

Next, a mechanism to prevent the cover member 320 from closing when the memory 400 is unlocked will be described.

Figure 26A:
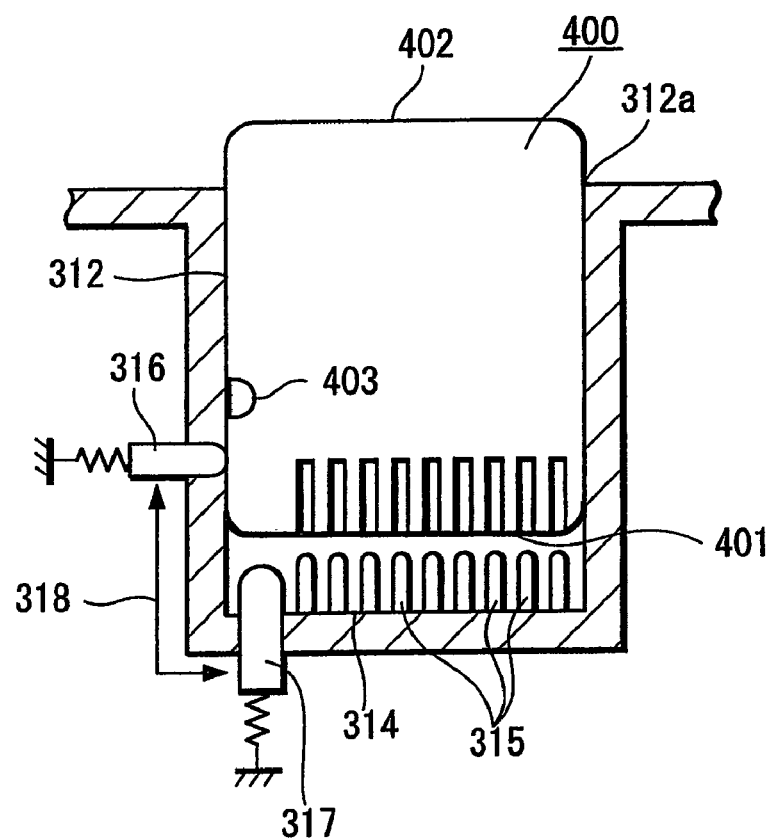
FIGS. 26A and 26B are explanatory views each illustrating a cross sectional configuration of the memory card inserted in the memory card slot and locked according to an embodiment of the invention.
Figure 26B:
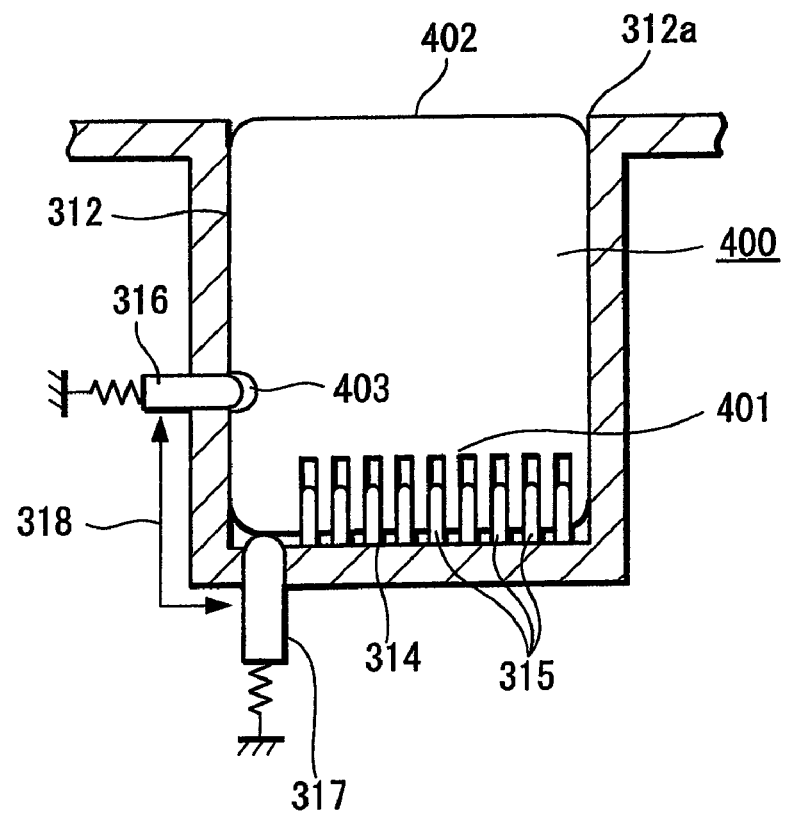

FIGS. 26A and 26B show schematic views of a mechanism to lock the memory card 400 inserted into the memory card slot 312. FIG. 26A illustrates the memory card 400 that is not completely inserted into the memory card slot 312; that is, the memory card 400 is unlocked, whereas FIG. 26B illustrates the memory card 400 that is inserted and locked. In FIGS. 26A and 26B, illustration of the cover member 320 is omitted. A plurality of terminals 315 are arranged on a memory card slot end 314 located at an innermost end of the memory card slot 312 so that the terminals 315 are, as shown in FIG. 26B, in contact with the contact portion 401 to write or read data such as image data from the memory card 400.

A locking member 316 is arranged inside the memory card slot 312 as shown in FIGS. 26A and 26B, and a lifting member 317 is arranged on the innermost end of the memory card slot end 314 of the memory card slot 312. The locking member 316 and lifting member 317 are configured to operate simultaneously with an interlocking member 318. In this state, the locking member 316 fits a notch 403 of the memory card 400 to lock the memory card 400 (see in FIG. 26B) so that the lifting member 317 will not lift the memory card 400. When the locking member 316 is not fitted into a notch 403 of the memory card 400 and the memory card 400 is unlocked (see in FIG. 26A), the lifting member 317 may lift the memory card 400. Hereinafter, a position of the memory card 400 that is locked is referred to as a first position, whereas a position of the memory card 400 that is unlocked and lifted by the lifting member 317 is referred to as a second position. In the first position, a position of the inlet 312a of the memory card slot is, as shown in FIG. 26B, is approximately the same level as a position of the rear end 402 of the memory card 400. In the second position, the rear end 402 of the memory card 400 substantially projects from the memory card inlet 312a.

Next, the memory card 400 inserted in the memory card slot 312 relative to the cover member 320 will be described with reference to FIGS. 24A, 24B, 24C, 24D. FIG. 24A is a view in which the memory card 400 is in a locked configuration and the cover 320 is in a closed configuration. FIG. 24B is a view in which the memory card 400 is in a locked configuration and the cover 320 is in an opened configuration. As shown in FIGS. 24A, 24B, when the memory card 400 is locked, the cover member 320 (not shown) turning on the fulcrum can optionally open and close. The rear end 402 of the locked memory card 400 is fixated by the ridges 321, 322 so that movements of the memory card 400 can be restricted. FIG. 24C is a view in which the memory card 400 is in the unlocked configuration and the cover 320 is in the open configuration. FIG. 24D is a view in which the memory card 400 is in the unlocked configuration as also shown in FIG. 24C, the cover 320 is about to close. FIG. 25 is an enlarged view illustrating a main portion of FIG. 24D. In FIG. 25, a turning fulcrum 323 of the cover member 320 is illustrated.

As shown in FIGS. 24C, 24D, and 25, the cover member 320 will not close when the memory card 400 is unlocked. Specifically, as shown in FIG. 25, a planer edge of the memory card 400 and the slope 321a of the ridge 321 on an edge of the cover member 320 face in parallel with each other. In this state, when the cover member 320 is pressed in the closing direction, only a planer portion 400a of the memory card 400 will be pressed but the rear end 402 of the memory card 400 will not be pressed. Thus, even though an attempt has been made to close the cover member 320, the cover member 320 will not be closed while the memory card 400 is unlocked.

If the ridge 321 is not formed on the edge of the cover member 320, the edge of the cover member 320 is in contact with the edge of the rear end 402 of the memory card 400 so that closing force applied to the cover member 320 acts as depressing force on the memory card 400 to depress the memory card 400. In this state, the cover member 320 will close even though the memory card is unlocked. If the cover member 320 has closed while the memory card is unlocked, the memory card 400 may be ejected while data is still written on or read from the memory card 400.

In contrast, with the video camera apparatus 100 of this embodiment, however, the cover member 320 will not close while the memory card 400 is unlocked, and the cover member 320 will close only when the memory card 400 is locked.

The aforementioned embodiments described are only examples of those applied to a digital camcorder in which data is records on a recording medium such as a hard disk; however, it is obvious that the embodiments can be applied to various other camera apparatuses other than the digital camcorder. For example, the embodiments may be applied to an electronic still camera apparatus that mainly captures static images.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus comprising:
    an enclosure configured to enclose an imaging unit;
    a terminal arrangement unit arranged adjacent to a curved surface of an edge portion of the enclosure, wherein the terminal arrangement unit includes a microphone terminal, a headphone terminal, and a HDMI terminal; and
    a cover member for covering the terminal arrangement unit, configured to move to open in parallel and along a straight guide groove provided near the terminal arrangement unit, and to turn along the curved surface of the edge portion when the cover has moved to open a prescribed amount along the straight guide groove.

2. A camera apparatus according to claim 1, further comprising:
    a first elastic member configured to apply force to the cover member in a direction in which the cover member turns along the curved surface of the edge portion, wherein
    the cover member turns along the curved surface of the edge portion of the enclosure by the applied force.

3. A camera apparatus according to claim 2, further comprising:
    a second elastic member configured to apply force to the cover member in a direction in which the cover member covers the terminal arrangement unit, wherein
    the cover member turns along the curved surface of the edge portion of the enclosure by the applied force.

4. A camera apparatus according to claim 2, wherein
    the cover member is positioned by a prescribed locking member at a position where the cover has turned along the curved surface of the edge portion.

* * * * *